US009374121B2

(12) United States Patent
Weissman et al.

(10) Patent No.: US 9,374,121 B2
(45) Date of Patent: Jun. 21, 2016

(54) TRANSCEIVER WITH SUPER-HETERODYNE AND ZERO INTERMEDIATE FREQUENCY (ZIF) TOPOLOGIES

(71) Applicant: QUALCOMM Incorporated, San Diego, CA (US)

(72) Inventors: Haim M. Weissman, Haifa (IL); Yossef Tsfaty, Haifa (IL); Mazhareddin Taghivand, San Jose, CA (US); Avigdor Brillant, Zichron Ya'akov (IL); Tao Li, San Diego, CA (US); Raviv Lior, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 13/962,945

(22) Filed: Aug. 8, 2013

(65) Prior Publication Data
US 2014/0065985 A1    Mar. 6, 2014

Related U.S. Application Data

(60) Provisional application No. 61/695,220, filed on Aug. 30, 2012.

(51) Int. Cl.
| H04B 1/30 | (2006.01) |
|---|---|
| H04B 1/40 | (2015.01) |
| H04B 1/28 | (2006.01) |
| H04B 1/403 | (2015.01) |

(52) U.S. Cl.
CPC .. *H04B 1/40* (2013.01); *H04B 1/28* (2013.01); *H04B 1/30* (2013.01); *H04B 1/406* (2013.01)

(58) Field of Classification Search
CPC ............................. H04L 27/0002; H04B 1/406
See application file for complete search history.

(56) References Cited

U.S. PATENT DOCUMENTS

| 7,539,476 B2 | 5/2009 | Devries et al. |
|---|---|---|
| 8,379,760 B2 | 2/2013 | Petilli |

(Continued)

FOREIGN PATENT DOCUMENTS

| CN | 102308484 A | 1/2012 |
|---|---|---|
| EP | 1845625 A2 | 10/2007 |
| WO | 2008002715 A2 | 1/2008 |

OTHER PUBLICATIONS

International Search Report and Written Opinion—PCT/US2013/057713—ISA/EPO—Dec. 10, 2013.

*Primary Examiner* — Nay Maung
*Assistant Examiner* — Cindy Trandai
(74) *Attorney, Agent, or Firm* — James Gutierrez

(57) ABSTRACT

Transceivers implemented with a combination of super-heterodyne and zero intermediate frequency (ZIF) topologies are disclosed. In an exemplary design, an apparatus includes a frequency conversion circuit and a local oscillator (LO) generator. The LO generator generates a first LO signal and a second LO signal. The frequency conversion circuit performs frequency conversion (i) between intermediate frequency (IF) and baseband, based on the first LO signal, for an IF signal and (ii) between radio frequency (RF) and baseband, based on the second LO signal, for an RF signal. The frequency conversion circuit may perform frequency downconversion (i) from IF to baseband for a super-heterodyne receiver and (ii) from RF to baseband for a ZIF receiver. Alternatively or additionally, the frequency conversion circuit may perform frequency upconversion (i) from baseband to IF for a super-heterodyne transmitter and (ii) from baseband to RF for a ZIF transmitter.

20 Claims, 18 Drawing Sheets

(56) References Cited

U.S. PATENT DOCUMENTS

| | | |
|---|---|---|
| 8,428,544 B2 | 4/2013 | Heck et al. |
| 2003/0003886 A1* | 1/2003 | Kato .................. H04B 1/406 455/127.1 |
| 2006/0126702 A1* | 6/2006 | Burdett .................... 375/136 |
| 2006/0279446 A1 | 12/2006 | Wang et al. |
| 2007/0111697 A1 | 5/2007 | Bellantoni et al. |
| 2007/0298748 A1* | 12/2007 | Banh et al. ................ 455/296 |
| 2009/0072912 A1* | 3/2009 | Kim et al. .................. 331/16 |
| 2012/0120992 A1 | 5/2012 | Soltanian et al. |
| 2015/0038185 A1* | 2/2015 | Saban et al. .............. 455/509 |

* cited by examiner

TRANSCEIVER WITH SUPER-HETERODYNE AND ZERO INTERMEDIATE FREQUENCY (ZIF) TOPOLOGIES

CLAIM OF PRIORITY UNDER 35 U.S.C. §119

The present application for patent claims priority to Provisional U.S. Application Ser. No. 61/695,220, entitled "DUAL TOPOLOGY RFIC ZIF/SUPER-HETERODYNE," filed Aug. 30, 2012, assigned to the assignee hereof, and expressly incorporated herein by reference.

BACKGROUND

I. Field

The present disclosure relates generally to electronics, and more specifically to a transceiver for wireless communication.

II. Background

A wireless device (e.g., a smartphone or a tablet) may include a transmitter and a receiver coupled to an antenna to support two-way communication. For data transmission, the transmitter may modulate a local oscillator (LO) signal with data to obtain a modulated signal, amplify the modulated signal to obtain an output radio frequency (RF) signal having the proper transmit power level, and transmit the output RF signal via the antenna to a base station. For data reception, the receiver may obtain a received RF signal via the antenna and may condition and process the received RF signal to recover data sent by the base station.

A wireless device may include a number of antennas and associated transmit and receive circuits to support data transmission and reception. The antennas may be placed at different locations on the wireless device due to various considerations such as the available space on the wireless device, the desired transmit and/or receive diversity, etc. It may be desirable to design the transmit and receive circuits such that good performance can be obtained for antennas placed at different locations on the wireless device.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Transceivers implemented with a combination of super-heterodyne and zero intermediate frequency (ZIF) topologies are disclosed herein. The terms "topology" and "architecture" are used interchangeably. A transceiver may include one or more transmitters and/or one or more receivers. A receiver or a transmitter may be implemented with a super-heterodyne topology or a ZIF topology. In the super-heterodyne topology, a signal is frequency converted between radio frequency (RF) and baseband in multiple stages, e.g., from RF to an intermediate frequency (IF) in one stage, and then from IF to baseband in another stage for a super-heterodyne receiver. RF may be any frequency suitable for signal transmission, and IF may be any frequency that is less than RF. In the ZIF topology, which is also commonly referred to as a direct-conversion topology, a signal is frequency converted between RF and baseband in one stage, e.g., from RF directly to baseband in one stage for a ZIF receiver. As an example, for IEEE 802.11ad, a super-heterodyne receiver may downconvert a received RF signal at 60 gigahertz (GHz) to 15 GHz, and then downconvert an IF signal from 15 GHz to baseband. A ZIF receiver may downconvert a received RF signal at 60 GHz directly to baseband in one stage. The super-heterodyne and ZIF topologies may use different circuits and/or have different requirements. A transceiver comprising a combination of super-heterodyne and ZIF receivers and/or a combination of super-heterodyne and ZIF transmitters may be referred to as a "dual-topology" transceiver. A dual-topology transceiver may be used for a wireless device, which may be any electronics device supporting wireless communication.

Figure 1:
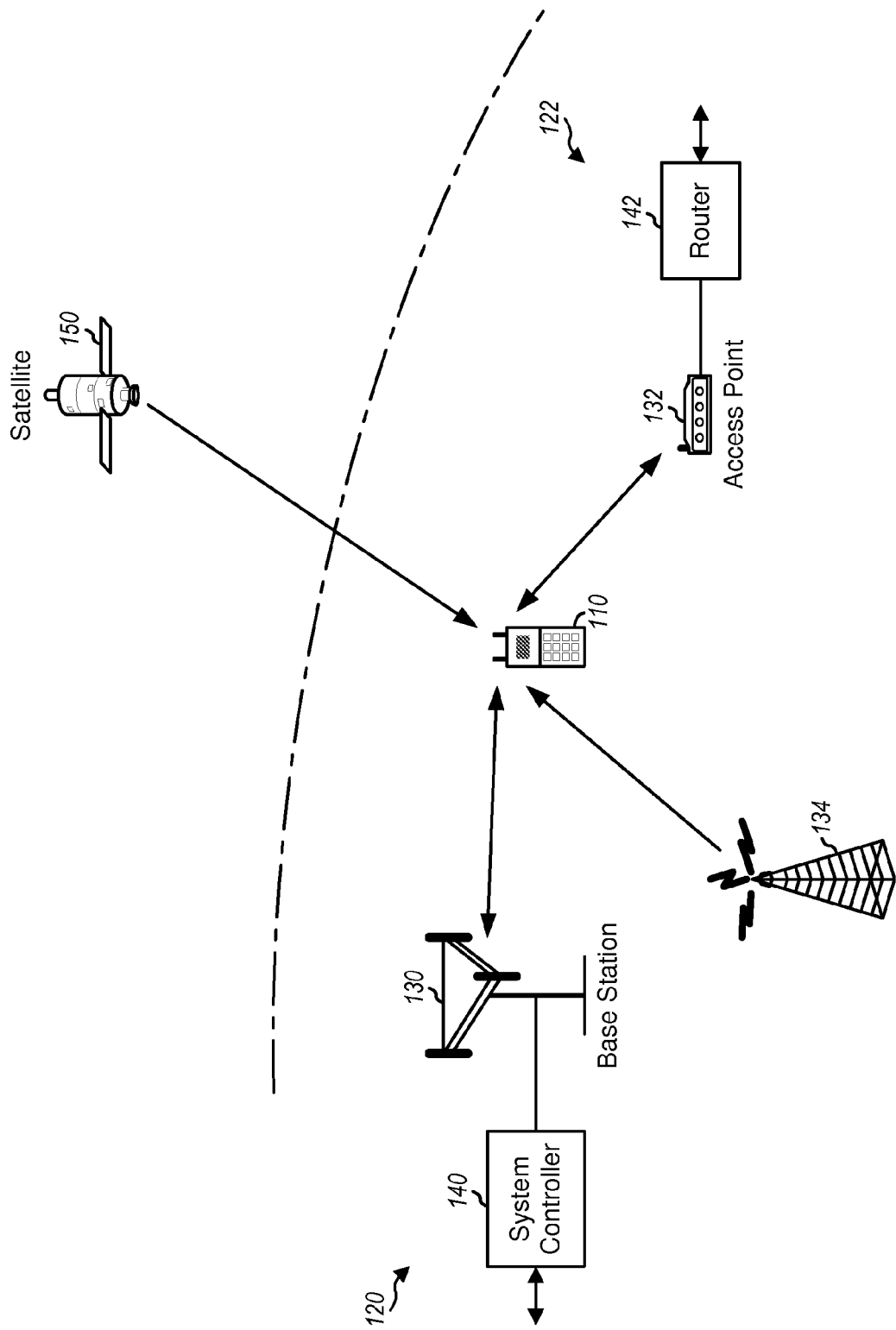
FIG. 1 shows a wireless device communicating with different wireless systems.

FIG. 1 shows a wireless device 110 capable of communicating with different wireless communication systems 120 and 122. Wireless system 120 may be a Long Term Evolution (LTE) system, a Code Division Multiple Access (CDMA) system, a Global System for Mobile Communications (GSM) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. Wireless system 122 may be a wireless local area network (WLAN) system, which may implement IEEE 802.11, Hiperlan, etc. For simplicity, FIG. 1 shows wireless system 120 including one base station 130 and one system controller 140, and wireless system 122 including one access point 132 and one router 142. In general, each wireless system may include any number of stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 120 and/or 122. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1x, EVDO, TD-SCDMA, GSM, IEEE 802.11, etc. Wireless device 110 may also support operation at a very high frequency, e.g., within millimeter (mm)-wave frequencies from 40 to 300 GHz. For example, wireless device 110 may support operation at 60 GHz for IEEE 802.11ad.

Figure 2:
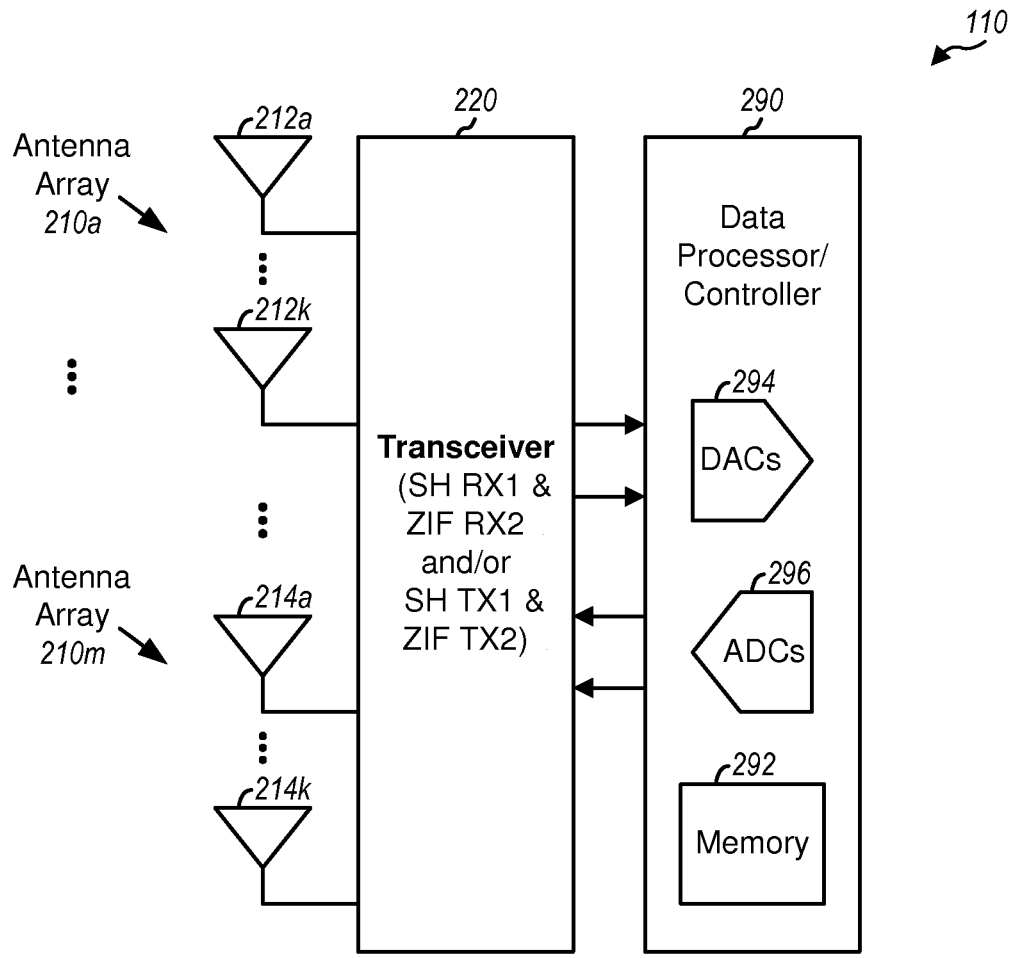
FIG. 2 shows an exemplary design of the wireless device in FIG. 1.

FIG. 2 shows an exemplary design of wireless device 110 in FIG. 1. In this exemplary design, wireless device 110 includes M antenna arrays 210a to 210m, where M may be one or greater. Antenna array 210a includes K antennas 212a to 210k, and antenna array 210m includes K antennas 214a to 214k, where K may be one or greater. The terms "antenna" and "antenna element" may be used interchangeably. In general, wireless device 110 may include any number of antenna arrays, and each antenna array may include any number of antennas. Antennas 212 and 214 of antenna arrays 210a to 210m may have similar sizes and shapes, similar antenna beams, and similar operating frequencies. Alternatively, antennas 212 and 214 of different antenna arrays 210a to 210m may have different sizes and/or shapes, different antenna beam patterns, and/or different operating frequencies.

Wireless device 110 includes a transceiver 220 and a data processor/controller 290. Transceiver 220 is coupled to antennas 212 and 214 and includes one or more receivers and/or one or more transmitters. For example, transceiver 220 may include a combination of a super-heterodyne receiver (RX1) and a ZIF receiver (RX2) and/or a combination of a super-heterodyne transmitter (TX1) and a ZIF transmitter (TX2). The receiver(s) process received RF signals from antennas 212 and/or 214 and provide output baseband signals to data processor 290. The transmitter(s) receive input baseband signals from data processor 290 and generate output RF signals for transmission via antennas 212 and/or 214. Transceiver 220 may be implemented on one or more analog integrated circuits (ICs), RF ICs (RFICs), mixed-signal ICs, etc.

Data processor 290 may perform various functions for wireless device 110. For example, data processor 290 may process data being transmitted via transceiver 220 and data being received via transceiver 220. Data processor 290 may also control the operation of various circuits within transceiver 220. Data processor 290 may include a memory 292, digital-to-analog converters (DACs) 294, and analog-to-digital converters (ADCs) 296. Memory 292 may store program codes and data for data processor 290. DACs 294 may digitize the output baseband signals from transceiver 220 and provide digital input samples. ADCs 296 may convert digital output samples to analog input baseband signals, which may be provided to transceiver 220. Data processor 290 may be implemented on one or more application specific integrated circuits (ASICs) and/or other ICs.

The receivers and transmitters within transceiver 220 may be implemented in various manners. For example, a receiver or a transmitter may be implemented with the super-heterodyne topology or the ZIF topology. Some exemplary designs of receivers and transmitters are described below.

Figure 3A:
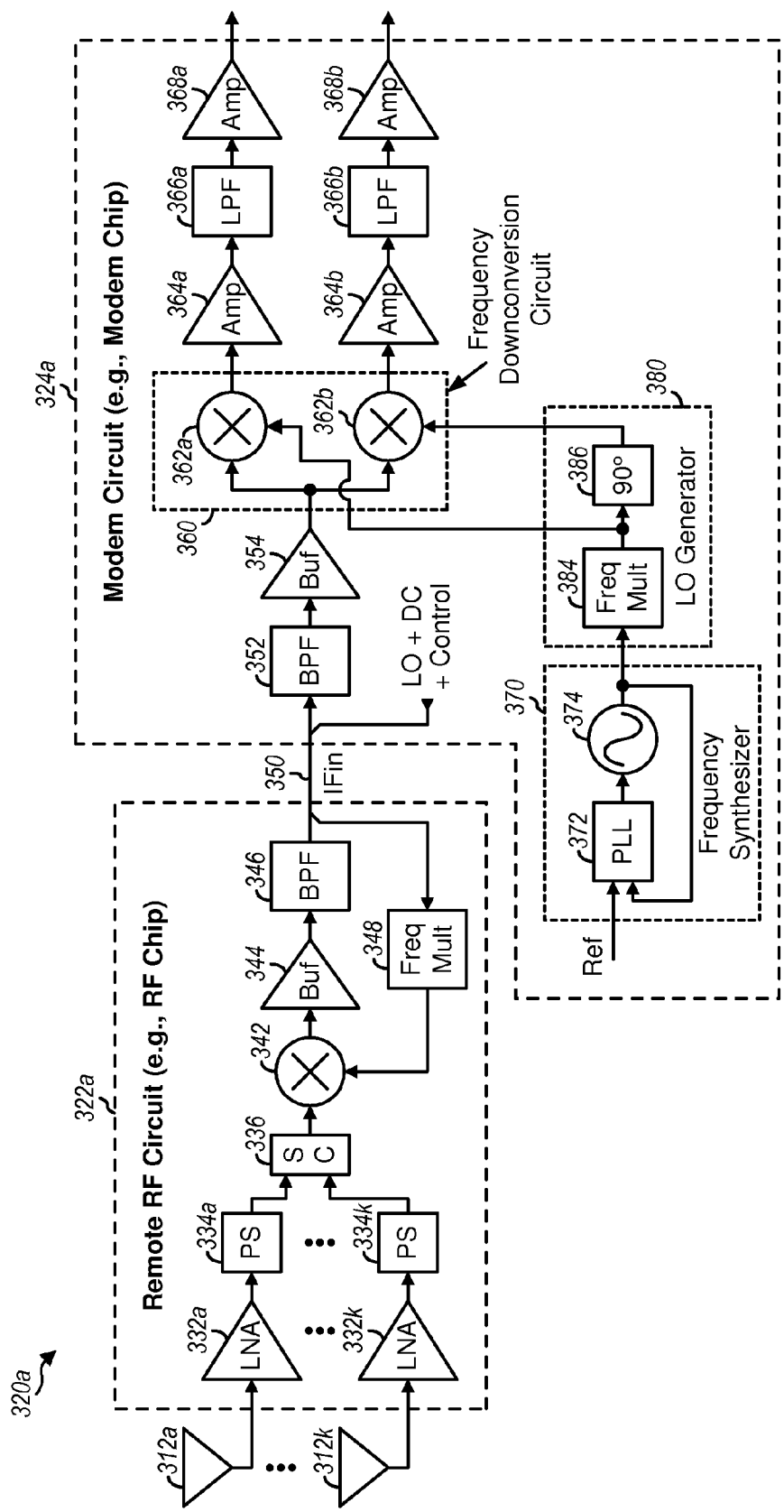
FIGS. 3A and 3B show two exemplary designs of a super-heterodyne receiver.

FIG. 3A shows a schematic diagram of an exemplary design of a super-heterodyne receiver 320a. Receiver 320a is implemented with (i) a remote RF circuit 322a that performs frequency downconversion from RF to IF and (ii) a modem circuit 324a that performs frequency downconversion from IF to baseband (BB). RF circuit 322a may be implemented on an RFIC chip. Modem circuit 324a may be implemented on another IC chip, which may be referred to as a modem chip.

Within RF circuit 322a, K low noise amplifiers (LNAs) 332a to 332k have their inputs coupled to K antennas 312a to 312k, respectively, where K may be one or greater. K phase shifters (PS) 334a to 334k have their inputs coupled to the outputs of LNAs 332a to 332k, respectively, and their outputs coupled to the inputs of a signal combiner (SC) 336. A downconverter 342 has its signal input coupled to the output of signal combiner 336 and its LO input coupled to the output of a frequency multiplier (Freq Mult) 348. A buffer (Buf) 344 has its input coupled to the output of downconverter 342 and its output coupled to the input of a bandpass filter (BPF) 346. The output of filter 346 and the input of frequency multiplier 348 are coupled to the output of RF circuit 322a.

Within modem circuit 324a, a bandpass filter 352 has its input coupled to the input of modem circuit 324a and its output coupled to the input of a buffer 354. A frequency downconversion circuit 360 comprises mixers 362a and 362b having their signal inputs coupled to the output of buffer 354. Amplifiers (Amp) 364a and 364b have their inputs coupled to the outputs of mixers 362a and 362b, respectively, and their outputs coupled to the inputs of lowpass filters (LPFs) 366a and 366b, respectively. Amplifiers 368a and 368b have their inputs coupled to the outputs of filters 366a and 366b, respectively, and their outputs coupled to a subsequent circuit, e.g., a data processor. Mixers 362a, amplifiers 364a and 368a, and filter 366a are for an inphase (I) signal path. Mixers 362b, amplifiers 364b and 368b, and filter 366b are for a quadrature (Q) signal path.

In the exemplary design shown in FIG. 3A, RF circuit 322a interfaces with modem circuit 324a via an RF cable 350, which carries (i) an input IF signal (IFin) from RF circuit 322a to modem circuit 324a and (ii) an IF LO signal, control data, and a direct current (DC) voltage from modem circuit 324a to RF circuit 322a. The control data may control the gain of LNAs 332, the phases of phase shifters 334, the frequency of frequency multiplier 348, etc. RF circuit 322a may also interface with modem circuit 324a via other interfaces.

Receiver 320a operates as follows. Antennas 312a to 312k receive signals transmitted by base stations and/or other transmitting stations and provide received RF signals to LNAs 332a to 332k, respectively. The received RF signal from each antenna 312 is amplified by an associated LNA 332 and further phase shifted by an associated phase shifter 334 by an amount selected for the associated antenna 312. The phase-shifted RF signals from all K phase shifters 334a to 334k are combined by signal combiner 336 to obtain an input RF signal. The input RF signal is downconverted with an RF LO signal by downconverter 342, buffered by buffer 344, and filtered by bandpass filter 346 to obtain the input IF signal, which is provided to modem circuit 324a via RF cable 350. Frequency multiplier 348 receives the IF LO signal via RF cable 350 and generates the RF LO signal for downconverter 342. The RF LO signal has a frequency that is higher (e.g., 4 or 6 times higher) than the frequency of the IF LO signal.

Within modem circuit 324a, the input IF signal is filtered by bandpass filter 352, buffered by buffer 354, and downconverted from IF to baseband with I and Q IF LO signals by mixers 362a and 362b within frequency downconversion circuit 360. The I and Q downconverted signals from mixers 362a and 362b are amplified by amplifiers 364a and 364b, filtered by lowpass filters 366a and 366b, and amplified by amplifiers 368a and 368b to generate I and Q output baseband signals, which may be provided to a data processor for further processing.

Modem circuit 324a further includes a frequency synthesizer 370 and an LO generator 380 to generate the I and Q IF LO signals for mixers 362a and 362b. In the exemplary design shown in FIG. 3A, frequency synthesizer 370 includes a phase locked loop (PLL) 372 and a voltage controlled oscillator (VCO) 374. PLL 372 has a first input receiving a reference signal (Ref) at a reference frequency, a second input coupled to the output of VCO 374, and an output coupled to the input of VCO 374. LO generator 380 includes a frequency multiplier 384 and a 90° phase shifter 386. Frequency multiplier 384 has its input coupled to the output of frequency synthesizer 370 and its output coupled to the input of phase shifter 386.

Frequency synthesizer 370 and LO generator 380 operate as follows. VCO 374 receives a control signal from PLL 372 and generates an oscillator signal at a first frequency determined by the control signal. PLL 372 receives the reference signal and the oscillator signal and generates the control signal such that the frequency and/or phase of the oscillator signal is locked to the frequency and/or phase of the reference signal. Frequency multiplier 384 receives the oscillator signal at the first frequency and generates the I IF LO signal at a second frequency, which may be an integer or non-integer multiple of the first frequency. Phase shifter 386 receives the I IF LO signal and generates the Q IF LO signal at the second frequency. Frequency multiplier 384 may also generate LO signals of different phases, and phase shifter 386 may be part of frequency multiplier 384.

The frequency of the oscillator signal from VCO 374 and the frequency of the IF LO signals from frequency multiplier 384 and phase shifter 386 may be selected based on the radio technologies being supported and circuit design considerations. As an example, for IEEE 802.11ad, the oscillator signal from VCO 374 may have a frequency of 7.5 GHz, and the I and Q IF LO signals from frequency multiplier 384 and phase shifter 386 may have a frequency of 15 GHz. Within RF circuit 322a, the IF LO signal received from modem circuit 324a may have a frequency of 7.5 GHz, and the RF LO signal provided by frequency multiplier 348 may have a frequency of 45 GHz. The received RF signal from antennas 312 may be centered at 60 GHz, and the input IF signal provided to modem circuit 324a may be centered as 15 GHz. Other frequencies may be used for IEEE 802.11ad and other radio technologies.

The center frequency of the input IF signal may be selected based on various factors such as the bandwidth of a desired signal being received. The bandwidth of the desired signal may be expressed in several forms, as follows:

$$BW(\%) = \frac{BW}{f_{center}} \times 100, \quad \text{Eq (1)}$$

$$BW_{relative} = \frac{BW}{f_{center}}, \text{ and} \quad \text{Eq (2)}$$

$$Q = \frac{f_{center}}{BW} = \frac{1}{BW_{relative}}, \quad \text{Eq (3)}$$

where
$f_{center}$ is the center frequency of the input IF signal,
BW is an absolute 3-decibel (dB) bandwidth of the desired signal,
BW (%) is a percentage bandwidth of the desired signal,
$BW_{relative}$ is a relative bandwidth of the desired signal, and
Q is a quality factor of the desired signal.

The center frequency of the input IF signal may be selected to (i) simplify implementation of circuits such as bandpass filter 346, (ii) obtain low signal loss in transmission of the input IF signal via RF cable 350, and (iii) simplify the design of frequency conversion circuits.

FIG. 3A shows an exemplary design of super-heterodyne receiver 320a. In general, a super-heterodyne receiver may include additional, fewer, or different circuits. For example, a super-heterodyne receiver may include switches, duplexers, diplexers, receive filters, matching circuits, etc. The circuits in a super-heterodyne receiver may also be arranged differently than the arrangement shown in FIG. 3A. For example, buffer 342 and bandpass filter 346 within RF circuit 322a may be swapped.

Figure 3B:
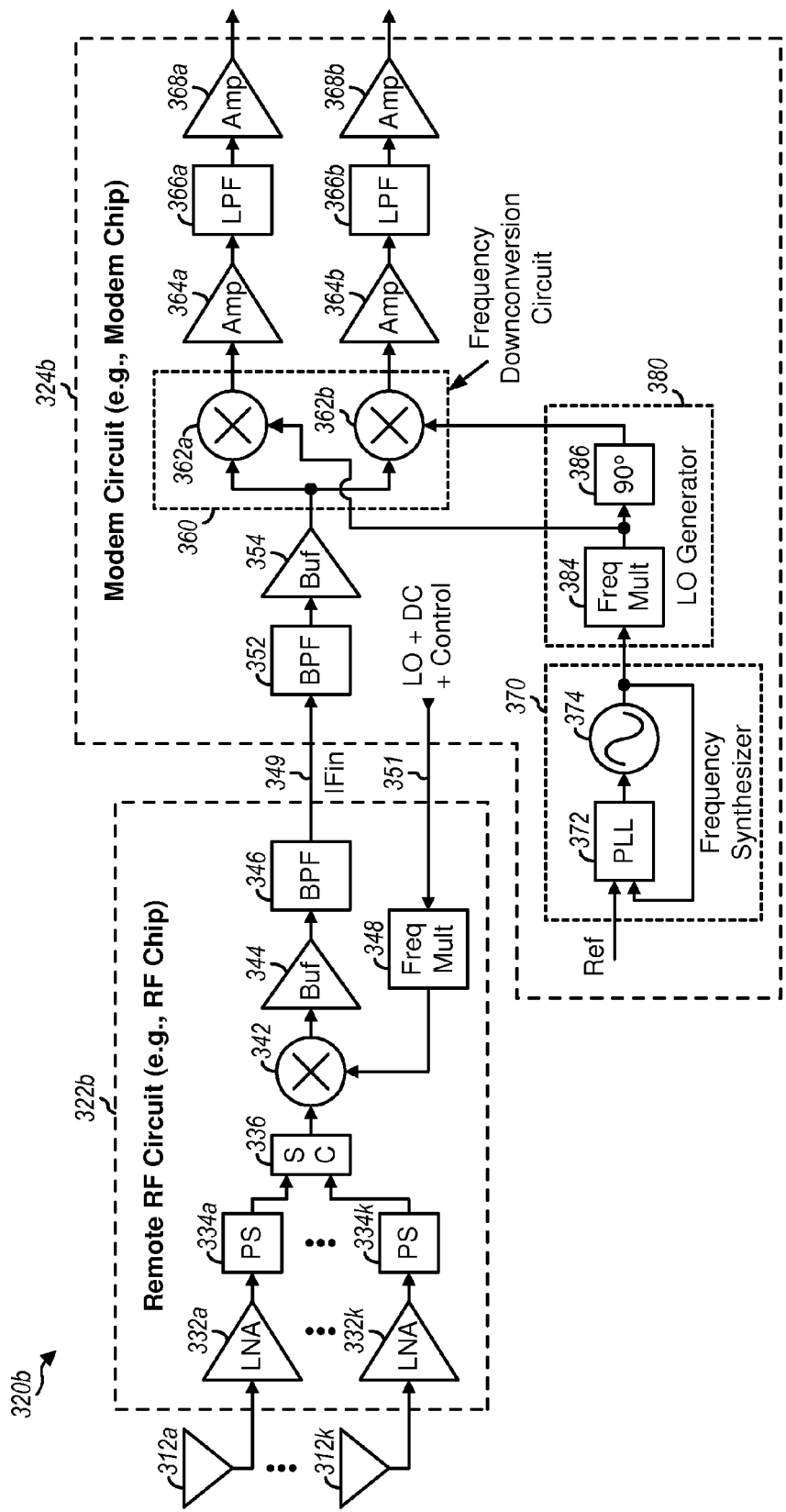

FIG. 3B shows a schematic diagram of an exemplary design of a super-heterodyne receiver 320b. Receiver 320b is implemented with a remote RF circuit 322b and a modem circuit 324b. RF circuit 322b includes all of the circuits in RF circuit 322a in FIG. 3A. Modem circuit 324b includes all of the circuits in modem circuit 324a in FIG. 3A. In the exemplary design shown in FIG. 3B, RF circuit 322b interfaces with modem circuit 324b via RF cables 349 and 351. RF cable 349 carries an input IF signal (IFin) from RF circuit 322b to modem circuit 324b. RF cable 351 carries an IF LO signal, control data, and a DC voltage from modem circuit 324b to RF circuit 322b.

FIGS. 3A and 3B show two exemplary designs of interfacing an RF circuit with a modem circuit. In general, an RF circuit may interface with a modem circuit via any suitable interface/interconnection, which may comprise one or more coaxial lines, differential lines, transmission lines, and/or signal lines of other types.

Figure 4:
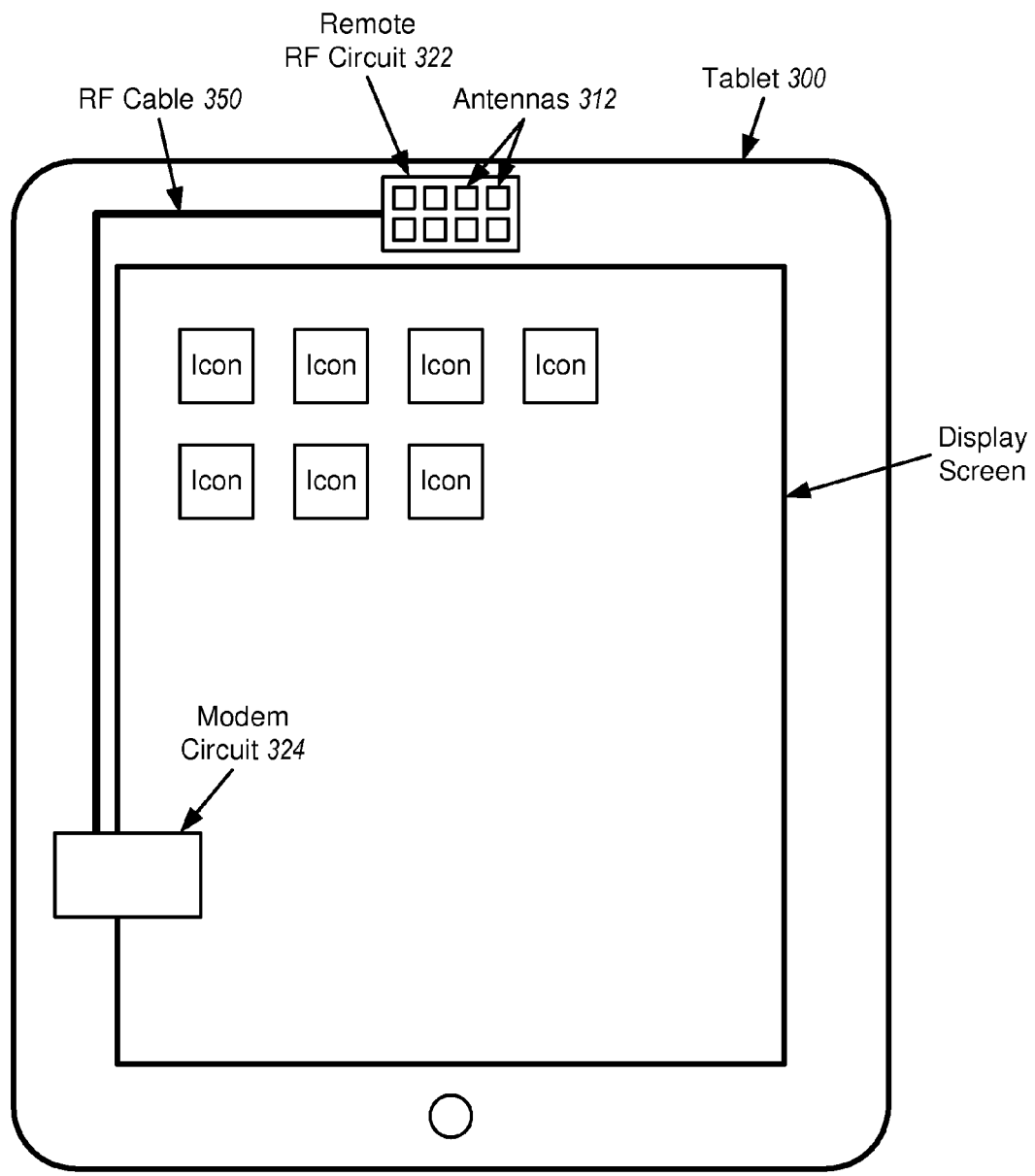
FIG. 4 shows an implementation of the super-heterodyne receiver in a tablet.

FIG. 4 shows an implementation of super-heterodyne receiver 320a in FIG. 3A in a tablet 300. RF circuit 322a may be located close to antennas 312 in order to reduce signal loss in transmission of received RF signals from antennas 312 to RF circuit 322a. Modem circuit 324a may be located close to a designated connector for tablet 300 and may interface with RF circuit 322a via RF cable 350. A 2-chip super-heterodyne receiver (e.g., as shown in FIGS. 3A and 4) may be desirable when the modem circuit cannot be located close to the antennas.

Figure 5:
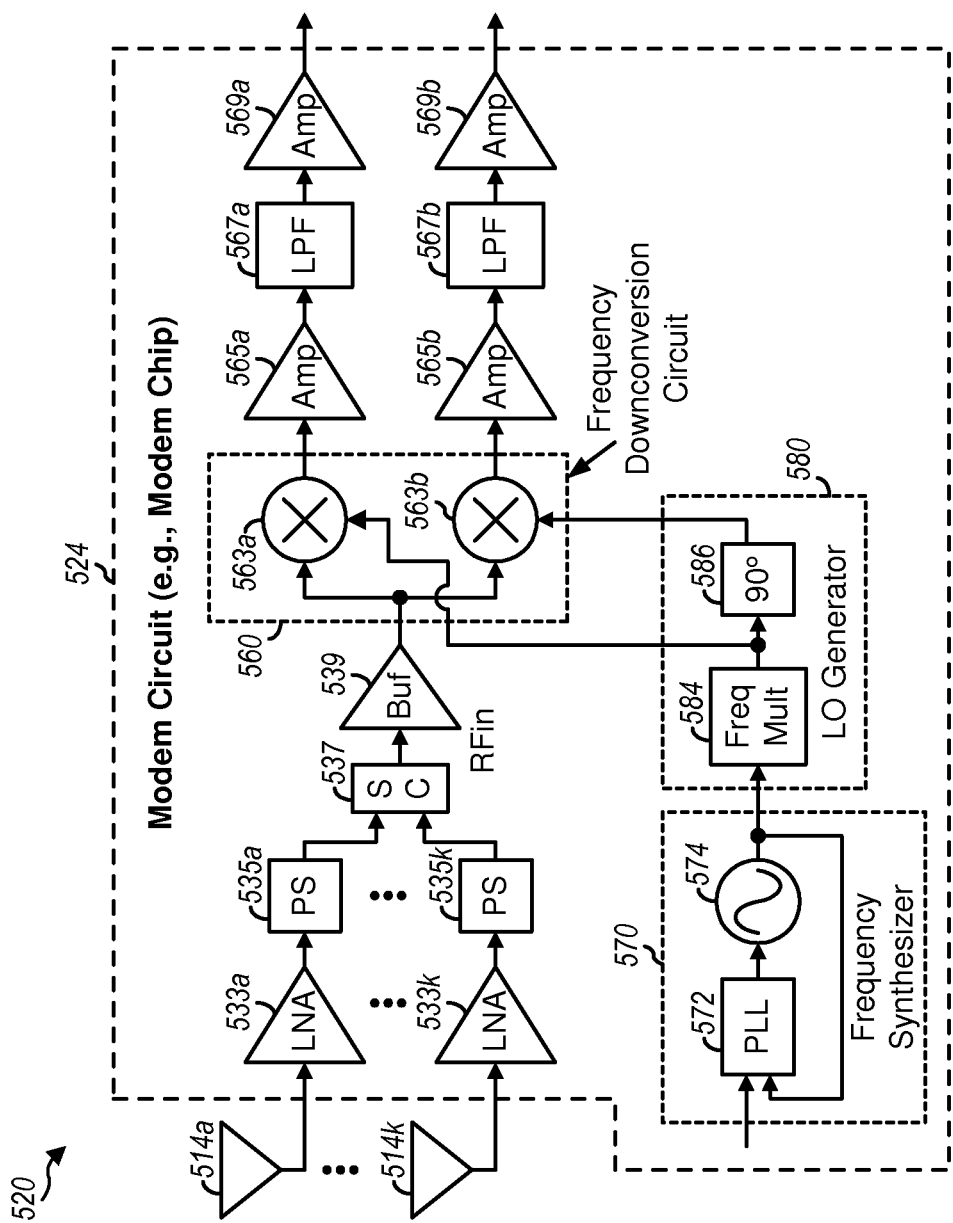
FIG. 5 shows an exemplary design of a ZIF receiver.

FIG. 5 shows a schematic diagram of an exemplary design of a ZIF receiver 520. Receiver 520 is implemented with a modem circuit 524 that performs frequency downconversion directly from RF to baseband. Modem circuit 524 may be implemented on an IC chip, which may be referred to as a modem chip.

Within modem circuit 524, K LNAs 533a to 533k have their inputs coupled to K antennas 514a to 514k, respectively, where K may be one or greater. K phase shifters 535a to 535k have their inputs coupled to the outputs of LNAs 533a to 533k, respectively, and their outputs coupled to the inputs of a signal combiner 537. A buffer 539 has its input coupled to the output of signal combiner 537. A frequency downconversion circuit 560 comprises mixers 563a and 563b having their signal inputs coupled to the output of buffer 539. Amplifiers 565a and 565b have their inputs coupled to the outputs of mixers 563a and 563b, respectively, and their outputs coupled to the inputs of lowpass filters 567a and 567b, respectively. Amplifiers 569a and 569b have their inputs coupled to the outputs of filters 567a and 567b, respectively, and their outputs coupled to a subsequent circuit, e.g., a data processor.

Receiver 520 operates as follows. Received RF signals from antennas 514a to 514k are amplified by LNAs 533a to 533k, phase shifted by phase shifters 535a to 535k, and combined by signal combiner 537 to obtain an input RF signal (RFin). The input RF signal is buffered by buffer 539 and downconverted from RF to baseband with I and Q RF LO signals by mixers 563a and 563b. The I and Q downconverted signals from mixers 563a and 563b are amplified by amplifiers 565a and 565b, filtered by lowpass filters 567a and 567b, and amplified by amplifiers 569a and 569b to generate I and Q output baseband signals, which may be provided to a data processor.

Modem circuit 524 further includes (i) a frequency synthesizer 570 comprising a PLL 572 and a VCO 574 and (ii) an LO generator 580 comprising a frequency multiplier 584 and a phase shifter 586. Frequency synthesizer 570 generates an oscillator signal. LO generator 580 receives the oscillator signal and generates the I and Q RF LO signals for mixers 563a and 563b. The frequency of the oscillator signal and the frequency of the RF LO signals may be selected based on the radio technologies being supported and circuit design considerations. As an example, for IEEE 802.11ad, the received RF signal from antennas 512 may be centered at 60 GHz, frequency synthesizer 570 may generate the oscillator signal at 15 GHz, and LO generator 580 may generate the I and Q RF LO signals at 60 GHz.

Figure 6:
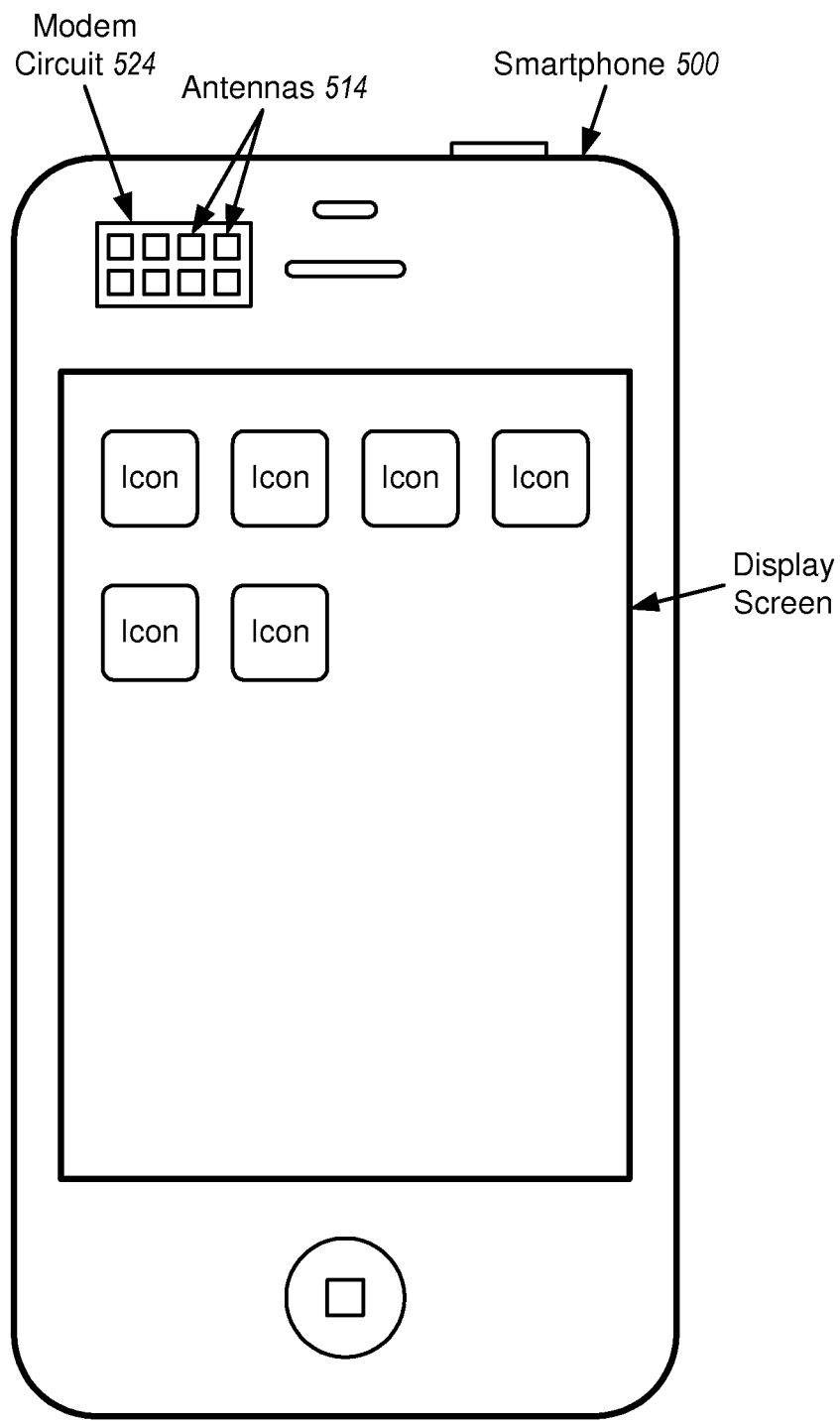
FIG. 6 shows an implementation of the ZIF receiver in a smartphone.

FIG. 6 shows an implementation of ZIF receiver 520 in FIG. 5 in a smartphone 500. Modem circuit 524 may be located close to antennas 514 in order to reduce signal transmission loss. A single-chip ZIF receiver (e.g., as shown in FIGS. 5 and 6) may be desirable in a small electronics device (e.g., a smartphone) where space is limited.

In an aspect of the present disclosure, a dual-topology transceiver may be used to support wireless communication. The dual-topology transceiver may include a combination of super-heterodyne and ZIF receivers and/or a combination of super-heterodyne and ZIF transmitters. The dual-topology transceiver may be used to support transmit and/or receive diversity, multiple-input multiple-output (MIMO) transmission, different types of wireless devices, different wireless systems, different radio technologies, etc.

Figure 7:
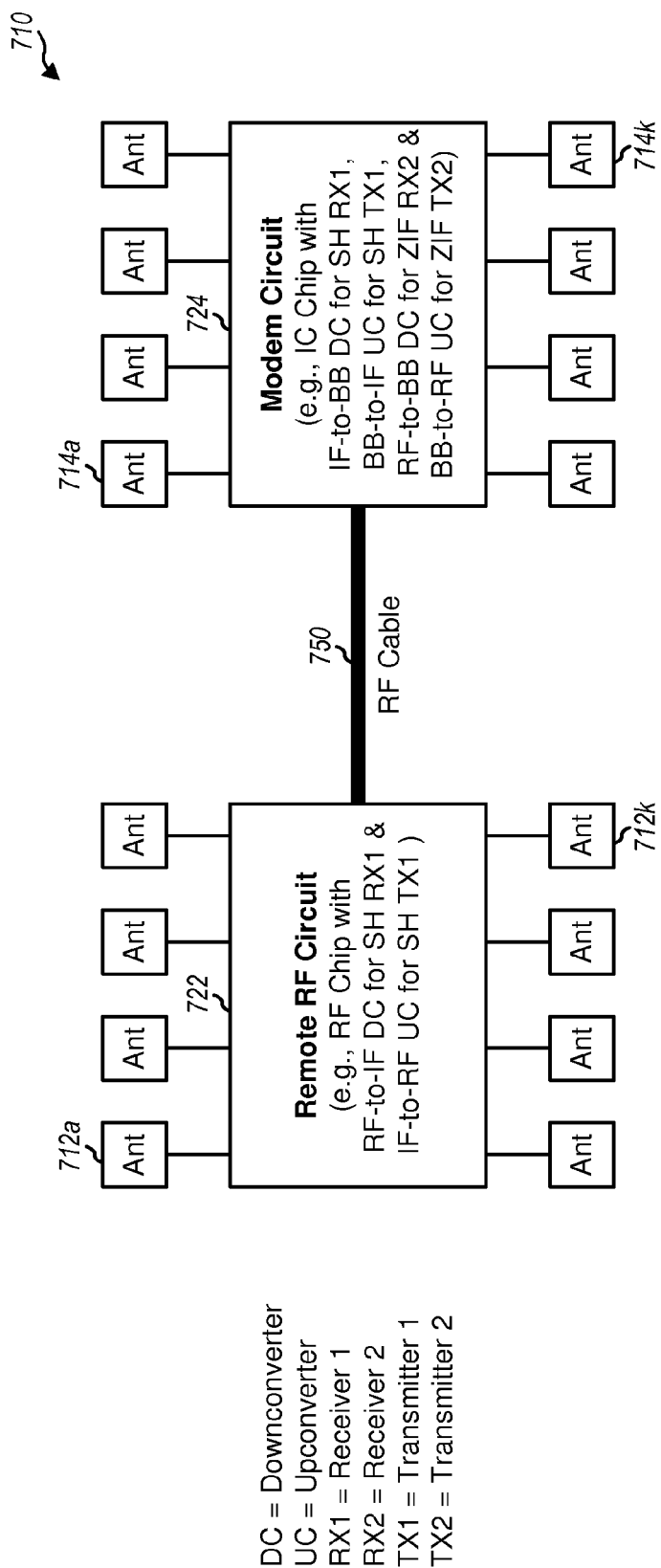
FIG. 7 shows an exemplary design of a dual-topology transceiver.

FIG. 7 shows an exemplary design of a wireless device 710 comprising a dual-topology transceiver. Wireless device 710 may be one exemplary design of wireless device 110 in FIG. 1. Wireless device 710 includes (i) a remote RF circuit 722 coupled to antennas 712a to 712k and (ii) a modem circuit 724 coupled to antennas 714a to 714k. RF circuit 722 may be located close to antennas 712 and may interface with modem circuit 724 via an RF cable 750. Modem circuit 724 may be located close to antennas 714. RF circuit 722 may be implemented on one IC chip, and modem circuit 724 may be implemented on another IC chip.

RF circuit 722 may include frequency downconversion circuits for one or more super-heterodyne receivers and/or frequency upconversion circuits for one or more super-heterodyne transmitters. Modem circuit 724 may include frequency downconversion circuits for one or more super-heterodyne receivers and/or frequency upconversion circuits for one or more super-heterodyne transmitters. Modem circuit 724 may also include frequency downconversion circuits for one or more ZIF receivers and/or frequency upconversion circuits for one or more ZIF transmitters. A frequency downconversion circuit may include one or more downconverters, and each downconverter may be implemented with one or more mixers. A frequency upconversion circuit may include one or more upconverters, and each upconverter may be implemented with one or more mixers.

A combination of super-heterodyne and ZIF receivers may be implemented in various manners. Some exemplary designs of super-heterodyne and ZIF receivers are described below.

Figure 8A:
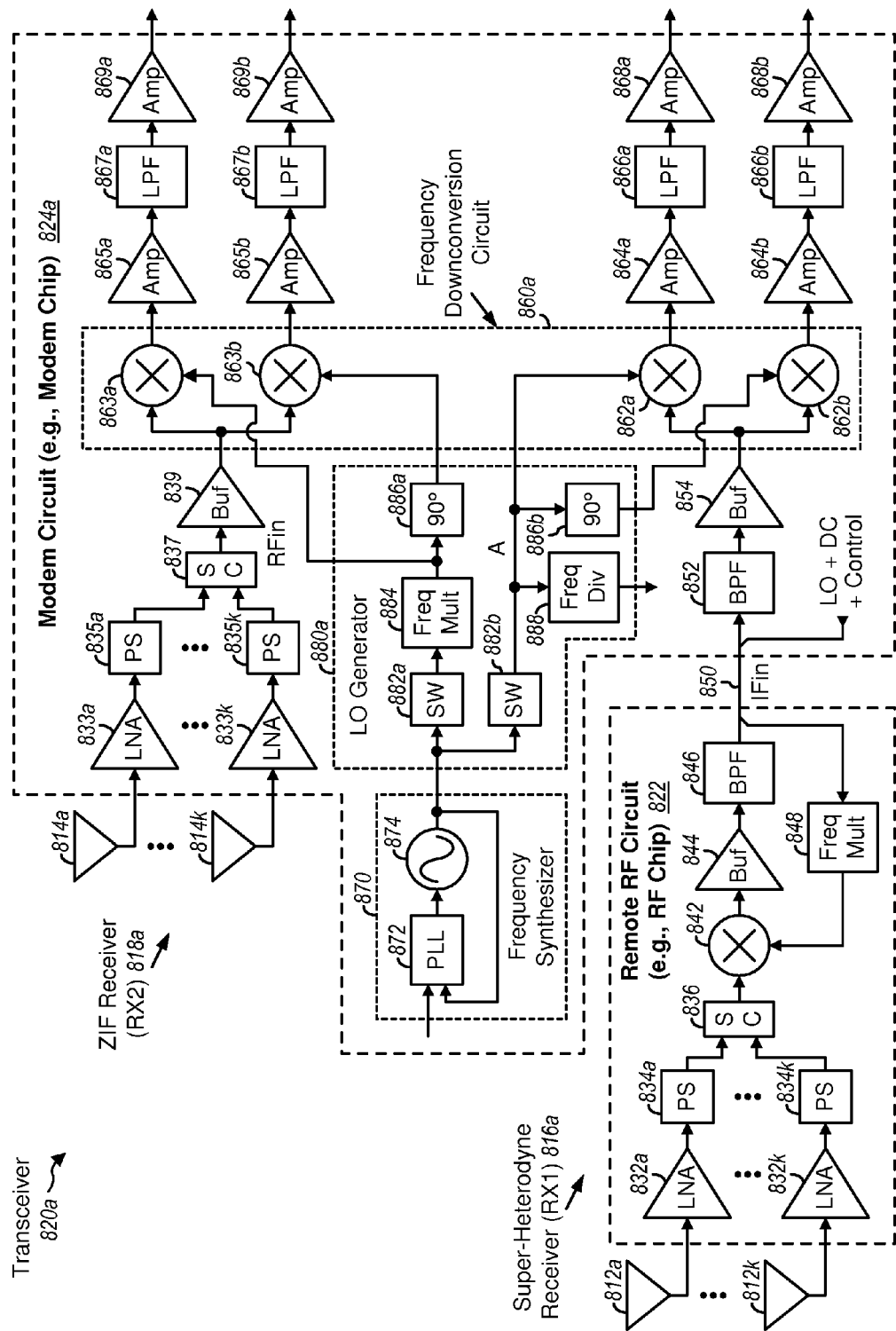
FIGS. 8A, 8B and 8C show three exemplary designs of a dual-topology transceiver comprising a super-heterodyne receiver and a ZIF receiver.

FIG. 8A shows a schematic diagram of an exemplary design of a dual-topology transceiver 820a comprising a super-heterodyne receiver (RX1) 816a and a ZIF receiver (RX2) 818a with separate baseband signal paths. Transceiver 820a is implemented with a remote RF circuit 822 and a modem circuit 824a. RF circuit 822 is coupled to antennas 812a to 812k and performs RF-to-IF downconversion for received RF signals from antennas 812 for super-heterodyne receiver 816a. Modem circuit 824a is coupled to antennas 814a to 814k and performs (i) IF-to-baseband downconversion for an input IF signal (RFin) from RF circuit 822 for super-heterodyne receiver 816a and (ii) RF-to-baseband downconversion for received RF signals from antennas 814 for ZIF receiver 818a. RF circuit 822 may be implemented on an RFIC chip, and modem circuit 824a may be implemented on another IC chip.

In the exemplary design shown in FIG. 8A, RF circuit 822 includes K LNAs 832a to 832k coupled to K antennas 812a to 812k, K phase shifters 834a to 834k, a signal combiner 836, a downconverter 842, a buffer 844, a bandpass filter 846, and a frequency multiplier 848, which are coupled as shown in FIG. 8A. RF circuit 822 includes all of the circuits in RF circuit 322a in FIG. 3A. RF circuit 822 interfaces with modem circuit 824a via an RF cable 850, which carries (i) the input IF signal from RF circuit 822 to modem circuit 824a and (ii) an IF LO signal, control data, and a DC voltage from modem circuit 824a to RF circuit 822.

In the exemplary design shown in FIG. 8A, modem circuit 824a includes K LNAs 833a to 833k coupled to K antennas 814a to 814k, K phase shifters 835a to 835k, a signal combiner 837, a buffer 839, mixers 863a and 863b, amplifiers 865a and 865b, lowpass filters 867a and 867b, and amplifiers 869a and 869b for ZIF receiver 818a. The circuits in modem circuit 824a for ZIF receiver 818a are similar to the circuits in modem circuit 524 in FIG. 5. Modem circuit 824a further includes a bandpass filter 852, a buffer 854, mixers 862a and 862b, amplifiers 864a and 864b, lowpass filters 866a and 866b, and amplifiers 868a and 868b for super-heterodyne receiver 816a. The circuits in modem circuit 824a for super-heterodyne receiver 816a are similar to the circuits in modem circuit 324a in FIG. 3A. Mixers 862a, 862b, 863a and 863b are part of a frequency downconversion circuit 860a. Mixers 862a and 862b perform IF-to-baseband downconversion for super-heterodyne receiver 816a. Mixers 863a and 863b perform RF-to-baseband downconversion for ZIF receiver 818a.

Super-heterodyne receiver 816a operates as follows. RF circuit 822 amplifies received RF signals from antennas 812, phase shifts the amplified RF signals, and combines the phase-shifted RF signals to obtain a first input RF signal. RF circuit 822 further downconverts the first input RF signal and provides the input IF signal to modem circuit 824a. Modem circuit 824a filters, buffers, and downconverts the input IF signal to obtain first I and Q downconverted signals. Modem circuit 824a further amplifies and filters the first I and Q downconverted signals and provides first I and Q output baseband signals for super-heterodyne receiver 816a.

ZIF receiver 818a operates as follows. Modem circuit 824a amplifies received RF signals from antennas 814, phase shifts the amplified RF signals, and combines the phase-shifted RF signals to obtain a second input RF signal (RFin). Modem circuit 824a further buffers and downconverts the second RF signal to obtain second I and Q downconverted signals. Modem circuit 824a then amplifies and filters the second I and Q downconverted signals and provides second I and Q output baseband signals for ZIF receiver 818*a*.

In an exemplary design, the first I and Q output baseband signals for super-heterodyne receiver 816*a* may be digitized by a first pair of ADCs, and the second I and Q output baseband signals for ZIF receiver 818*a* may be digitized by a second pair of ADCs. The ADCs may correspond to ADCs 296 in FIG. 2. In this exemplary design, super-heterodyne receiver 816*a* and ZIF receiver 818*a* may operate concurrently. In another exemplary design, a single pair of ADCs may be coupled to amplifiers 868*a*, 868*b*, 869*a* and 869*b* via switches (not shown in FIG. 8A). The switches may provide (i) the first I and Q output baseband signals to the ADCs in a first operating mode when super-heterodyne receiver 816*a* is selected or (ii) the second I and Q output baseband signals to the ADCs in a second operating mode when ZIF receiver 818*a* is selected. In this exemplary design, super-heterodyne receiver 816*a* and ZIF receiver 818*a* may operate in a time division multiplexed (TDM) manner. For both exemplary designs, the ADCs may be implemented in modem circuit 824*a*, or a digital processor coupled to modem circuit 824*a* (e.g., as shown in FIG. 2), or some other circuit.

In the exemplary design shown in FIG. 8A, modem circuit 824*a* includes a frequency synthesizer 870 and an LO generator 880*a* to generate (i) I and Q IF LO signals for mixers 862*a* and 862*b* and (ii) I and Q RF LO signals for mixers 863*a* and 863*b*. Frequency synthesizer 870 includes a PLL 872 and a VCO 874, which are coupled in similar manner as PLL 372 and 374 in FIG. 3A. LO generator 880*a* includes switches (SW) 882*a* and 882*b*, a frequency multiplier 884, phase shifters 886*a* and 886*b*, and a frequency divider (Freq Div) 888. Switch 882*a* is coupled between frequency synthesizer 870 and frequency multiplier 884. Frequency multiplier 884 has its output coupled to an LO input of mixer 863*b*. Phase shifter 886*a* has its input coupled to the output of frequency multiplier 884 and its output coupled to an LO input of mixer 863*b*. Switch 882*b* is coupled between frequency synthesizer 870 and node A. Mixer 862*a* has its LO input coupled to node A. Phase shifter 886*b* has its input coupled to node A and its output coupled to an LO input of mixer 862*b*. Frequency divider 888 has its input coupled to node A and its output providing an IF LO signal for RF circuit 822. Switch 882*a*, frequency multiplier 884, and phase shifter 886*a* support generation of I and Q RF LO signals for mixers 863*a* and 863*b*. Switch 882*b* and phase shifter 886*b* support generation of I and Q IF LO signals for mixers 862*a* and 862*b*.

Frequency synthesizer 870 and LO generator 880*a* operate as follows. VCO 874 generates an oscillator signal at a first frequency determined by a control signal from PLL 872. PLL 872 generates the control signal such that the frequency and/or phase of the oscillator signal is locked to the frequency and/or phase of a reference signal. When ZIF receiver 818*a* is selected/enabled, switch 882*a* provides the oscillator signal to frequency multiplier 884, frequency multiplier 884 generates the I RF LO signal based on the oscillator signal, and phase shifter 886*a* generates the Q RF LO signal based on the I RF LO signal. When super-heterodyne receiver 816*a* is selected/enabled, switch 882*b* provides the oscillator signal as the I IF LO signal, phase shifter 886*b* generates the Q IF LO signal based on the I IF LO signal, and frequency divider 888 generates the IF LO signal based on the I IF LO signal. Frequency synthesizer 870 and LO generator 880*a* may be implemented in other manners and may generate the I and Q RF LO signals and the I and Q IF LO signals in other manners.

In an exemplary design, for IEEE 802.11ad, frequency synthesizer 870 may generate the oscillator signal at 15 GHz. Frequency multiplier 884 may be a multiply-by-4 multiplier and may generate the I RF LO signal at 60 GHz. Frequency divider 888 may be a divide-by-2 divider and may generate the IF LO signal at 7.5 GHz. Frequency multiplier 848 may be a multiply-by-6 multiplier and may generate an RF LO signal at 45 GHz based on the IF LO signal at 7.5 GHz. RF circuit 822 may provide the input IF signal at 15 GHz. RF LO signals and IF LO signals at other frequencies may also be generated for super-heterodyne receiver 816*a* and ZIF receiver 818*a*.

Figure 8B:
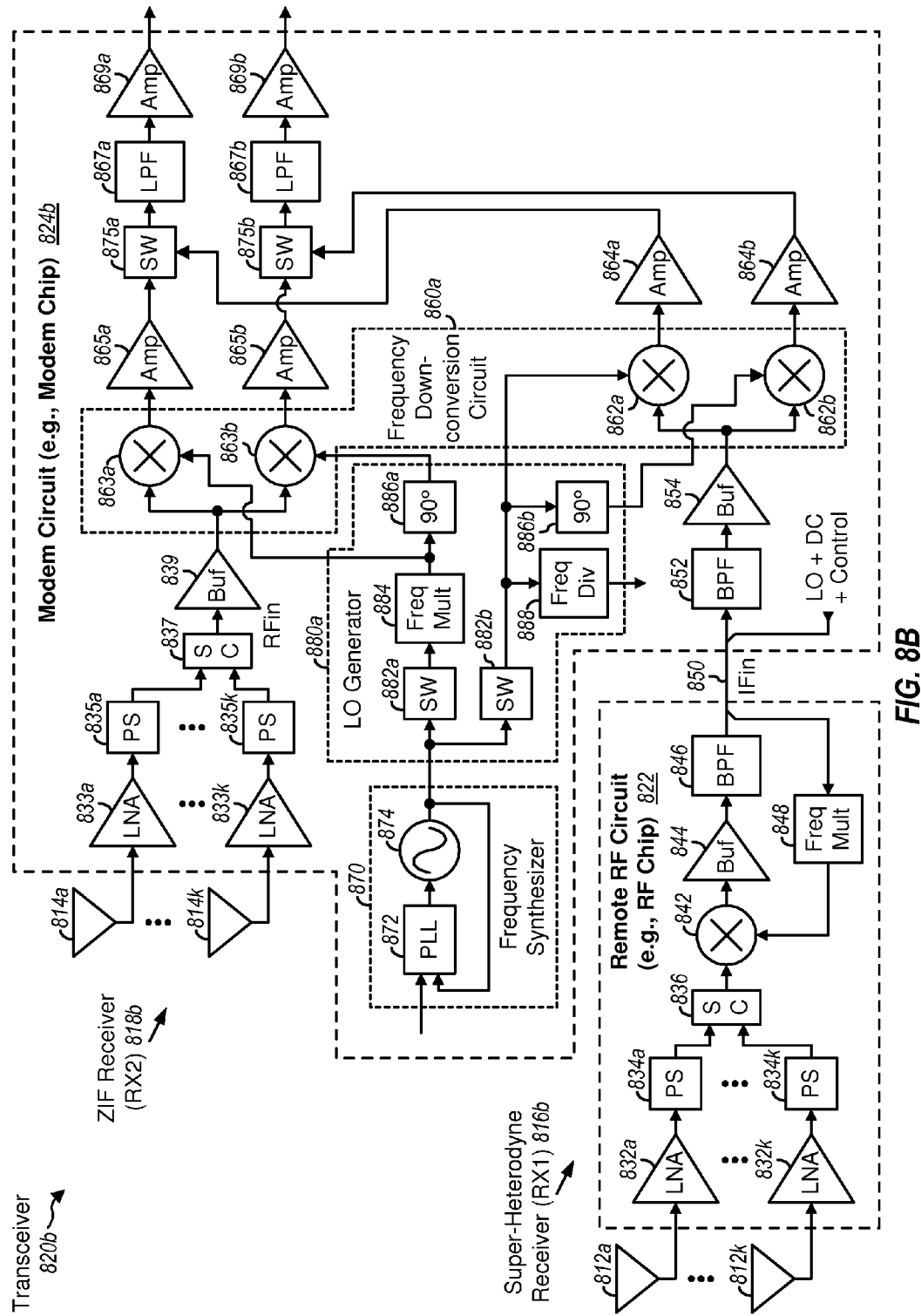

FIG. 8B shows a schematic diagram of an exemplary design of a dual-topology transceiver 820*b* comprising a super-heterodyne receiver 816*b* and a ZIF receiver 818*b* with a shared baseband signal path. Transceiver 820*b* is implemented with remote RF circuit 822 and a modem circuit 824*b*. Modem circuit 824*b* includes all of the circuits in modem circuit 824*a* in FIG. 8A with the following differences. Modem circuit 824*b* includes a single baseband signal path comprising lowpass filters 867*a* and 867*b* and amplifiers 869*a* and 869*b*. The single baseband signal path is used for both super-heterodyne receiver 816*b* and ZIF receiver 818*b*. Modem circuit 824*b* does not include lowpass filters 866*a* and 866*b* and amplifiers 868*a* and 868*b* in modem circuit 824*a* in FIG. 8A. Modem circuit 824*b* further includes single-pole double-throw (SPDT) switches 875*a* and 875*b*. Switch 875*a* has its single pole coupled to the input of filter 867*a* and its two throws coupled to the outputs of amplifiers 864*a* and 865*a*. Switch 875*b* has its single pole coupled to the input of filter 867*b* and its two throws coupled to the outputs of amplifiers 864*b* and 865*b*.

Dual-topology transceiver 820*b* operates as follows. When super-heterodyne receiver 816*b* is selected, the received RF signals from antennas 814 are conditioned and downconverted by downconverter 842 and frequency downconversion circuit 860*a*. Amplifiers 864*a* and 864*b* provide I and Q baseband signals to lowpass filters 867*a* and 867*b* via switches 875*a* and 875*b*. When ZIF receiver 818*b* is selected, the received RF signals from antennas 814 are conditioned and downconverted by frequency downconversion circuit 860*a*. Amplifiers 865*a* and 865*b* provide I and Q baseband signals to lowpass filters 867*a* and 867*b* via switches 875*a* and 875*b*.

FIG. 8B shows an exemplary design in which switches 875*a* and 875*b* are used to select between super-heterodyne receiver 816*b* and ZIF receiver 818*b*. In another exemplary design, the outputs of amplifiers 864*a* and 865*a* are coupled together, and the outputs of amplifiers 864*b* and 865*b* are coupled together. In this exemplary design, amplifiers 865*a* and 865*b* may be placed in a tri-state or a high-Z state when super-heterodyne receiver 816*b* is selected, and amplifiers 864*a* and 864*b* may be placed in the tri-state or high-Z state when ZIF receiver 818*b* is selected.

Figure 8C:
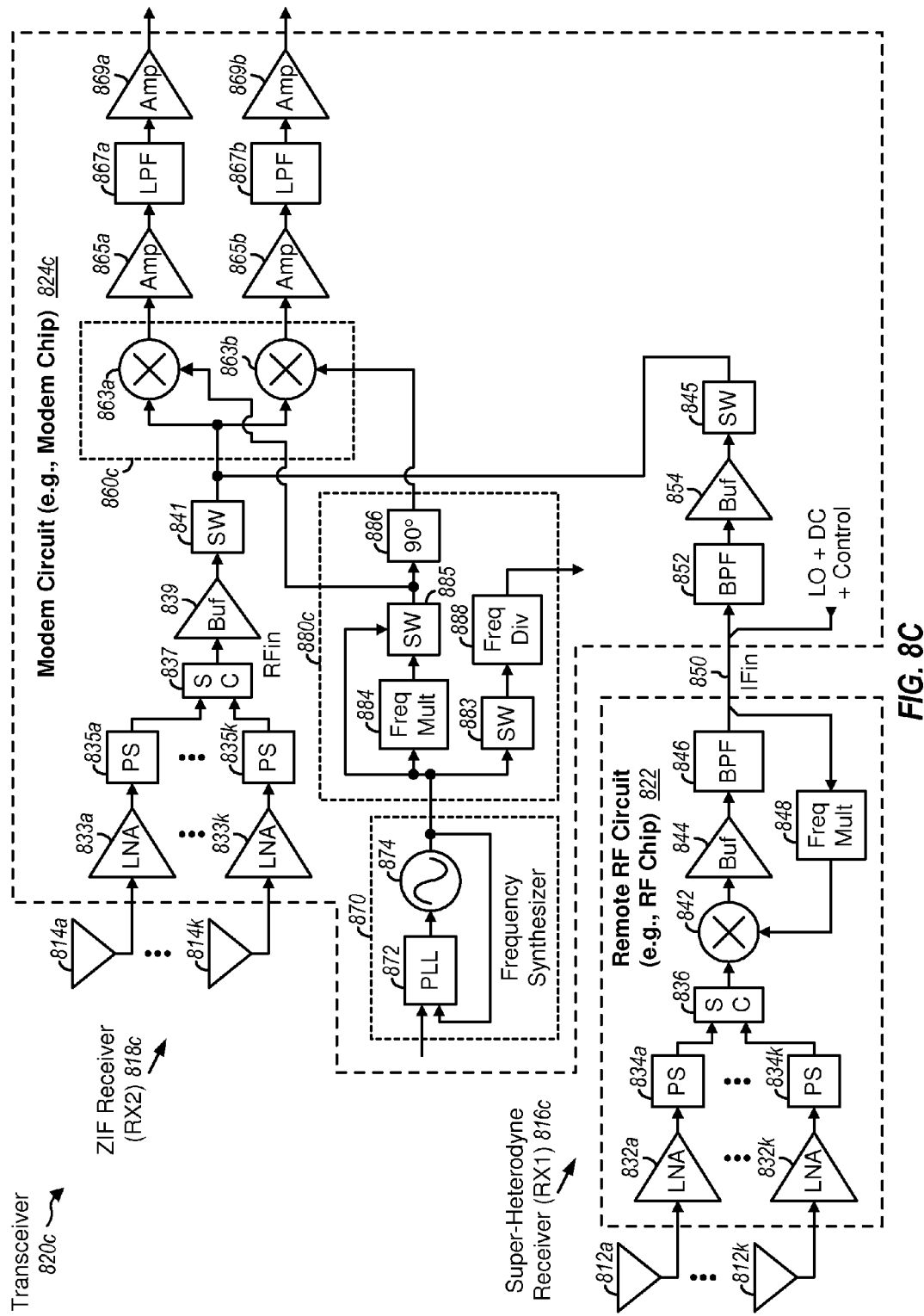

FIG. 8C shows a schematic diagram of an exemplary design of a dual-topology transceiver 820*c* comprising a super-heterodyne receiver 816*c* and a ZIF receiver 818*c* with a shared RF/IF and baseband signal path. Transceiver 820*c* is implemented with remote RF circuit 822 and a modem circuit 824*c*. Modem circuit 824*c* includes all of the circuits in modem circuit 824*a* in FIG. 8A with the following differences. Modem circuit 824*c* includes a single RF/IF and baseband signal path comprising mixers 863*a* and 863*b*, amplifiers 865*a* and 865*b*, lowpass filters 867*a* and 867*b*, and amplifiers 869*a* and 869*b*. Mixers 863*a* and 863*b* are part of a frequency downconversion circuit 860*c*. The single RF/IF and baseband signal path is used for both super-heterodyne receiver 816*c* and ZIF receiver 818*c*. Modem circuit 824*c* does not include mixers 862*a* and 862*b*, amplifiers 864*a* and 864*b*, lowpass filters 866*a* and 866*b*, and amplifiers 868*a* and 868*b* in modem circuit 824*a* in FIG. 8A. Modem circuit 824*c* further includes (i) a switch 841 coupled between buffer 839 and frequency downconversion circuit 860c and (ii) a switch 845 coupled between buffer 854 and frequency downconversion circuit 860c.

Dual-topology transceiver 820c operates as follows. When super-heterodyne receiver 816c is selected, the received RF signals from antennas 812 are conditioned and downconverted by downconverter 842 to obtain an input IF signal (IFin). The input IF signal is filtered by filter 852, buffered by buffer 854, routed through switch 845, downconverted by mixers 863, and conditioned by amplifiers 865, filters 867, and amplifiers 869. When ZIF receiver 818c is selected, the received RF signals from antennas 814 are conditioned by LNAs 833, phase shifters 835, and signal combiner 837 to obtain an input RF signal (RFin). The input RF signal is buffered by buffer 839, routed through switch 841, downconverted by mixers 863, and further conditioned by amplifiers 865, filters 867, and amplifiers 869. Mixers 863 thus receive (i) the input IF signal via switch 845 when super-heterodyne receiver 816c is selected or (ii) the input RF signal via switch 841 when ZIF receiver 818c is selected. When super-heterodyne receiver 816c is selected, switch 841 provides isolation of the shared RF/IF signal path from the RF signal path for ZIF receiver 818c. When ZIF receiver 818c is selected, switch 845 provides isolation of the shared RF/IF signal path from the RF signal path for super-heterodyne receiver 816c.

Modem circuit 824c includes LO generator 880c instead of LO generator 880a in FIG. 8A. LO generator 880c includes switches 883 and 885, frequency multiplier 884, phase shifter 886, and frequency divider 888. Frequency multiplier 884 has its input coupled to the output of frequency synthesizer 870. Switch 885 has its two throws coupled to the outputs of frequency synthesizer 870 and frequency multiplier 884 and its single pole coupled to the input of phase shifter 886. Switch 883 is coupled between the output of frequency synthesizer 870 and the input of frequency divider 888.

LO generator 880c operates as follows. When ZIF receiver 818c is selected, frequency multiplier 884 generates an I RF LO signal based on an oscillator signal from frequency synthesizer 870, and switch 885 provides the I RF LO signal to phase shifter 886, which generates a Q RF LO signal based on the I RF LO signal. When super-heterodyne receiver 816c is selected, switch 885 provides the oscillator signal as an I IF LO signal, and phase shifter 886 generates a Q IF LO signal based on the I IF LO signal. Furthermore, switch 883 provides the oscillator signal to frequency divider 888, which generates and provides an IF LO signal to RF circuit 822. For IEEE 802.11ad, frequency synthesizer 870 may generate the oscillator signal at 15 GHz. Frequency multiplier 884 may be a multiply-by-4 multiplier and may generate the I RF LO signal at 60 GHz. Frequency divider 888 may be a divide-by-2 divider and may generate the IF LO signal at 7.5 GHz. RF LO signals and IF LO signals at other frequencies may also be generated for super-heterodyne receiver 816c and ZIF receiver 818c. Frequency synthesizer 870 and LO generator 880c may be implemented in other manners and may also generate the I and Q RF LO signals and the I and Q IF LO signals in other manners.

FIGS. 8A to 8C show some exemplary designs of dual-topology transceivers comprising a super-heterodyne receiver and a ZIF receiver. Dual-topology transceivers comprising a combination of super-heterodyne and ZIF receivers may also be implemented in other manners. For example, phase shifters 834 and signal combiner 836 (or phase shifters 835 and signal combiner 837) may be omitted for signal reception via a single antenna. Filtering, buffering, and amplification may also be performed in other manners. For example, bandpass filters 846 and/or 852 may be omitted. The circuits in a dual-topology transceiver may also be arranged differently from the arrangements shown in FIGS. 8A to 8C.

A combination of super-heterodyne and ZIF transmitters may be implemented in various manners. Some exemplary designs of super-heterodyne and ZIF transmitters are described below.

Figure 9A:
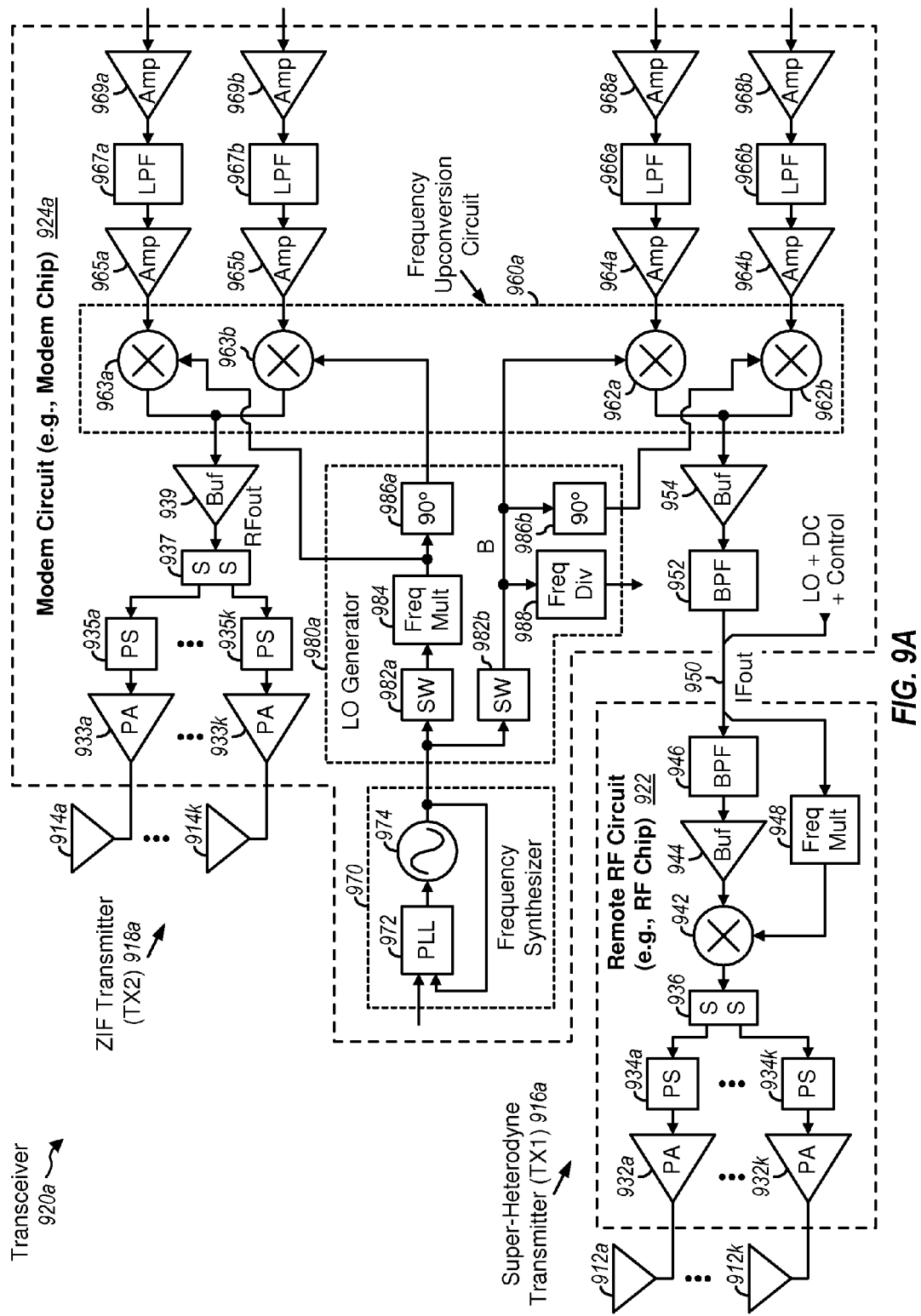
FIGS. 9A, 9B and 9C show three exemplary designs of a dual-topology transceiver comprising a super-heterodyne transmitter and a ZIF transmitter.

FIG. 9A shows a schematic diagram of an exemplary design of a dual-topology transceiver 920a comprising a super-heterodyne transmitter 916a and a ZIF transmitter 918a with separate baseband signal paths. Transceiver 920a is implemented with a remote RF circuit 922 and a modem circuit 924a. Modem circuit 924a is coupled to antennas 914a to 914k and performs (i) baseband-to-RF upconversion for ZIF transmitter 918a and (ii) baseband-to-IF upconversion for super-heterodyne transmitter 916a. RF circuit 922 is coupled to antennas 912a to 912k and performs IF-to-RF upconversion for super-heterodyne transmitter 916a. RF circuit 922 may be implemented on an RFIC chip, and modem circuit 924a may be implemented on another IC chip.

Modem circuit 924a includes circuits for ZIF transmitter 918a. Within modem circuit 924a, amplifiers 969a and 969b have their inputs coupled to a preceding circuit (e.g., a data processor) and their outputs coupled to the inputs of lowpass filters 967a and 967b, respectively. Amplifiers 965a and 965b have their inputs coupled to the outputs of filters 967a and 967b, respectively, and their outputs coupled to the signal inputs of mixers 963a and 963b, respectively. Mixers 963a and 963b are part of a frequency upconversion circuit 960a. The outputs of mixers 963a and 963b are summed and coupled to the input of a buffer 939. A signal splitter (SS) 937 has its input coupled to the output of buffer 939 and its K outputs coupled to K phase shifters 935a to 935k, where K may be one or greater. K power amplifiers (PA) 933a to 933k have their inputs coupled to the outputs of phase shifters 935a to 935k, respectively, and their outputs coupled to antennas 914a to 914k, respectively.

Modem circuit 924a also includes circuits for super-heterodyne transmitter 916a. Within modem circuit 924a, amplifiers 968a and 968b have their inputs coupled to a preceding circuit (e.g., a data processor) and their outputs coupled to the inputs of lowpass filters 966a and 966b, respectively. Amplifiers 964a and 964b have their inputs coupled to the outputs of filters 966a and 966b, respectively, and their outputs coupled to the signal inputs of mixers 962a and 962b, respectively. Mixers 962a and 962b are also part of frequency upconversion circuit 960a. The outputs of mixers 962a and 962b are summed and coupled to the input of a buffer 954. A bandpass filter 952 has its input coupled to the output of buffer 954 and its output coupled to an output of modem circuit 924a.

RF circuit 922 includes circuits for super-heterodyne transmitter 916a. Within RF circuit 922, a bandpass filter 946 has its input coupled to an input of RF circuit 922 and its output coupled to the input of a buffer 944. An upconverter 942 has its signal input coupled to the output of buffer 944, its LO input coupled to the output of a frequency multiplier 948, and its output coupled to the input of a signal splitter 936. Frequency multiplier 948 has its input coupled to the input of RF circuit 922. Signal splitter 936 has its K outputs coupled to K phase shifters 934a to 934k, where K may be one or greater. K PAs 932a to 932k have their inputs coupled to the outputs of phase shifters 934a to 934k, respectively, and their outputs coupled to antennas 912a to 912k, respectively. RF circuit 922 interfaces with modem circuit 924a via an RF cable 950, which carries an output IF signal (IFout), an IF LO signal, control data, and a DC voltage from modem circuit 924a.

Super-heterodyne transmitter 916a operates as follows. Within modem circuit 924a, first I and Q input baseband signals are amplified by amplifiers 968a and 968b, filtered by filters 966a and 966b, amplified by amplifiers 964a and 964b, and upconverted from baseband to IF by mixers 962a and 962b. An upconverted signal from mixers 962a and 962b is buffered by buffer 954 and filtered by filter 952 to generate the output IF signal, which is provided to RF circuit 922 via RF cable 950. Within RF circuit 922, the output IF signal is filtered by filter 946, buffered by buffer 944, and upconverted from IF to RF by upconverter 942. An output RF signal from upconverter 942 is split by signal splitter 936, phase shifted by phase shifters 934a to 934k, amplified by PAs 932a to 932k, and transmitted via antennas 912a to 912k.

ZIF transmitter 918a operates as follows. Within modem circuit 924a, second I and Q input baseband signals are amplified by amplifiers 969a and 969b, filtered by filters 967a and 967b, amplified by amplifiers 965a and 965b, and upconverted from baseband to RF by mixers 963a and 963b. An upconverted signal from mixers 963a and 963b is buffered by buffer 939, split by signal splitter 937, phase shifted by phase shifters 935a to 935k, amplified by PAs 933a to 933k, and transmitted via antennas 914a to 914k.

In an exemplary design, the first I and Q output baseband signals for super-heterodyne transmitter 916a may be generated by a first pair of DACs, and the second I and Q output baseband signals for ZIF transmitter 918a may be generated by a second pair of DACs. The DACs may correspond to DACs 294 in FIG. 2. In this exemplary design, super-heterodyne transmitter 916a and ZIF transmitter 918a may operate concurrently. In another exemplary design, a single pair of DACs may be coupled to amplifiers 968a, 968b, 969a and 969b via switches (not shown in FIG. 9A). The switches may provide (i) the first I and Q output baseband signals from the DACs to amplifiers 968a and 968b when super-heterodyne transmitter 916a is selected or (ii) the second I and Q output baseband signals from the DACs to amplifiers 969a and 969b when ZIF transmitter 918a is selected. In this exemplary design, super-heterodyne transmitter 916a and ZIF transmitter 918a may operate in a TDM manner. For both exemplary designs, the DACs may be implemented in modem circuit 924a, or a digital processor coupled to modem circuit 924a (e.g., as shown in FIG. 2), or some other circuit.

In the exemplary design shown in FIG. 9A, modem circuit 924a includes a frequency synthesizer 970 and an LO generator 980a to generate (i) I and Q IF LO signals for mixers 962a and 962b and (ii) I and Q RF LO signals for mixers 963a and 963b. Frequency synthesizer 970 includes a PLL 972 and a VCO 974, which are coupled in similar manner as PLL 372 and VCO 374 in FIG. 3A. LO generator 980a includes switches 982a and 982b, a frequency multiplier 984, phase shifters 986a and 986b, and a frequency divider 988. Switch 982a is coupled between the output of frequency synthesizer 970 and the input of frequency multiplier 984. Frequency multiplier 984 has its output coupled to an LO input of mixer 963a. Phase shifter 986a has its input coupled to the output of frequency multiplier 984 and its output coupled to an LO input of mixer 963b. Switch 982b is coupled between the output of PLL 970 and node B. Mixer 962a has its LO input coupled to node B. Phase shifter 986b has its input coupled to node B and its output coupled to an LO input of mixer 962b. Frequency divider 988 has its input coupled to node B and its output providing the IF LO signal.

Frequency synthesizer 970 and LO generator 980a operate as follows. VCO 974 generates an oscillator signal at a first frequency determined by a control signal from PLL 972. PLL 972 generates the control signal such that the frequency and/or phase of the oscillator signal is locked to the frequency and/or phase of a reference signal. When ZIF transmitter 918a is selected, switch 982a provides the oscillator signal to frequency multiplier 984, frequency multiplier 984 generates the I RF LO signal based on the oscillator signal, and phase shifter 986a generates the Q RF LO signal based on the I RF LO signal. When super-heterodyne transmitter 916a is selected, switch 982b provides the oscillator signal as the I IF LO signal, phase shifter 986b generates the Q IF LO signal based on the I IF LO signal, and frequency divider 988 generates the IF LO signal based on the I IF LO signal. The IF LO signal is provided to RF circuit 922 via RF cable 950. Frequency synthesizer 970 and LO generator 980a may be implemented in other manners and may generate the I and Q RF LO signals and the I and Q IF LO signals in other manners.

In an exemplary design, for IEEE 802.11ad, frequency synthesizer 970 may generate the oscillator signal at 15 GHz. Frequency multiplier 984 may be a multiply-by-4 multiplier and may generate the I RF LO signal at 60 GHz. Frequency divider 988 may be a divide-by-2 divider and may generate the IF LO signal at 7.5 GHz. Frequency multiplier 948 may be a multiply-by-6 multiplier and may generate an RF LO signal at 45 GHz based on the IF LO signal at 7.5 GHz. Modem circuit 924a may provide the output IF signal at 15 GHz, and RF circuit 922 may generate an output RF signal at 60 GHz based on the output IF signal at 15 GHz and the RF LO signal at 45 GHz. RF LO signals and IF LO signals at other frequencies may also be generated for super-heterodyne transmitter 916a and ZIF transmitter 918a.

Figure 9B:
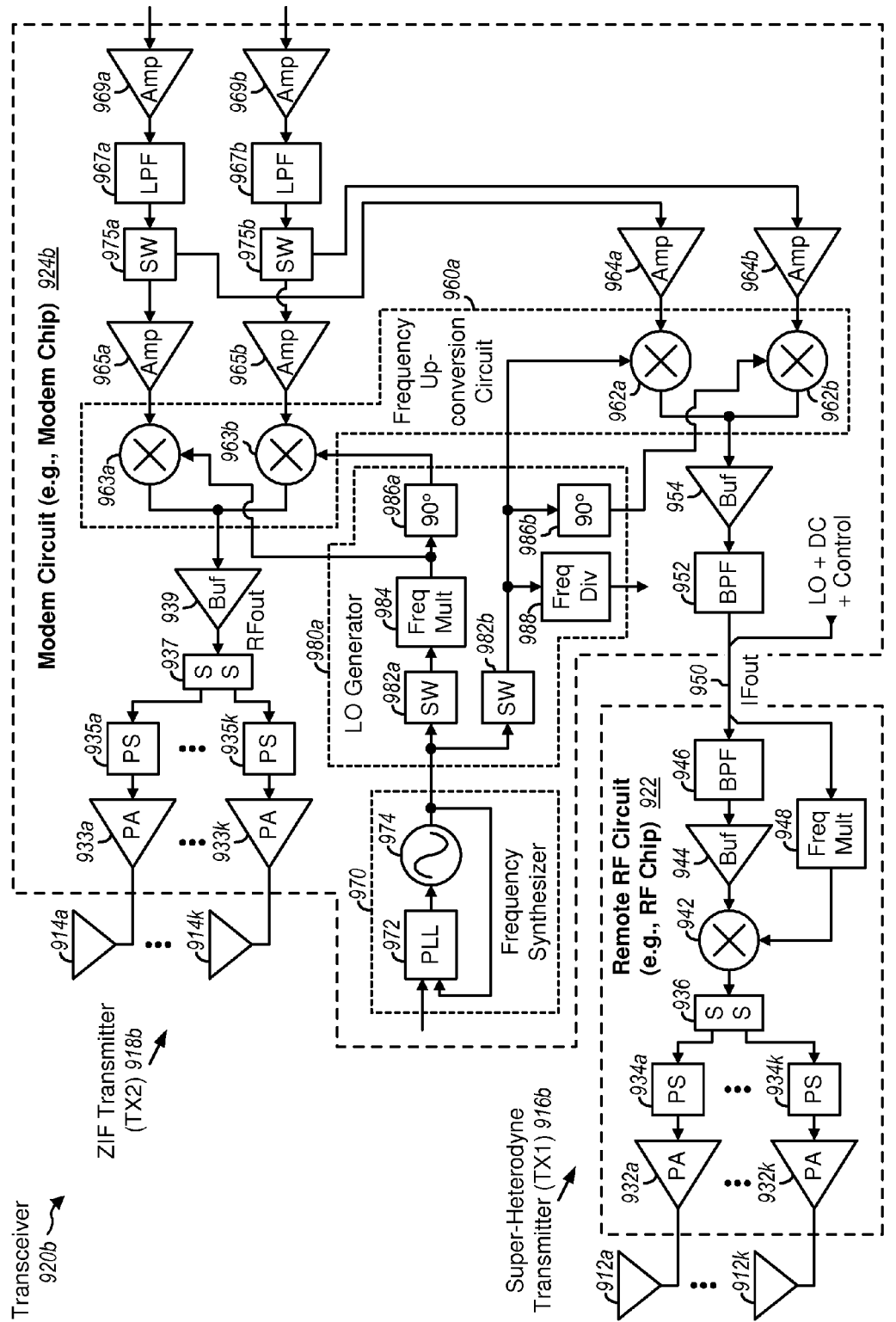

FIG. 9B shows a schematic diagram of an exemplary design of a dual-topology transceiver 920b comprising a super-heterodyne transmitter 916b and a ZIF transmitter 918b with a shared baseband signal path. Transceiver 920b is implemented with remote RF circuit 922 and a modem circuit 924b. Modem circuit 924b includes all of the circuits in modem circuit 924a in FIG. 9A with the following differences. Modem circuit 924b includes a single baseband signal path comprising amplifiers 969a and 969b and lowpass filters 967a and 967b. The single baseband signal path is used for both super-heterodyne transmitter 916b and ZIF transmitter 918b. Modem circuit 924b does not include amplifiers 968a and 968b and lowpass filters 966a and 966b in modem circuit 924a in FIG. 9A. Modem circuit 924b further includes SPDT switches 975a and 975b. Switch 975a has its single pole coupled to the output of filter 967a and its two throws coupled to the inputs of amplifiers 964a and 965a. Switch 975b has its single pole coupled to the output of filter 967b and its two throws coupled to the inputs of amplifiers 964b and 965b.

Dual-topology transceiver 920b operates as follows. When super-heterodyne transmitter 916b is selected, I and Q input baseband signals are amplified by amplifiers 969a and 969b, filtered by filters 967a and 967b, routed via switches 975a and 975b, amplified by amplifiers 964a and 964b, and upconverted by mixers 962a and 962b to generate an upconverted IF signal. The upconverted IF signal is conditioned, upconverted from IF to RF, and transmitted via antennas 912. When ZIF transmitter 918b is selected, I and Q input baseband signals are amplified by amplifiers 969a and 969b, filtered by filters 967a and 967b, routed via switches 975a and 975b, amplified by amplifiers 965a and 965b, and upconverted by mixers 963a and 963b to generate an upconverted RF signal. The upconverted RF signal is conditioned and transmitted via antennas 914.

Figure 9C:
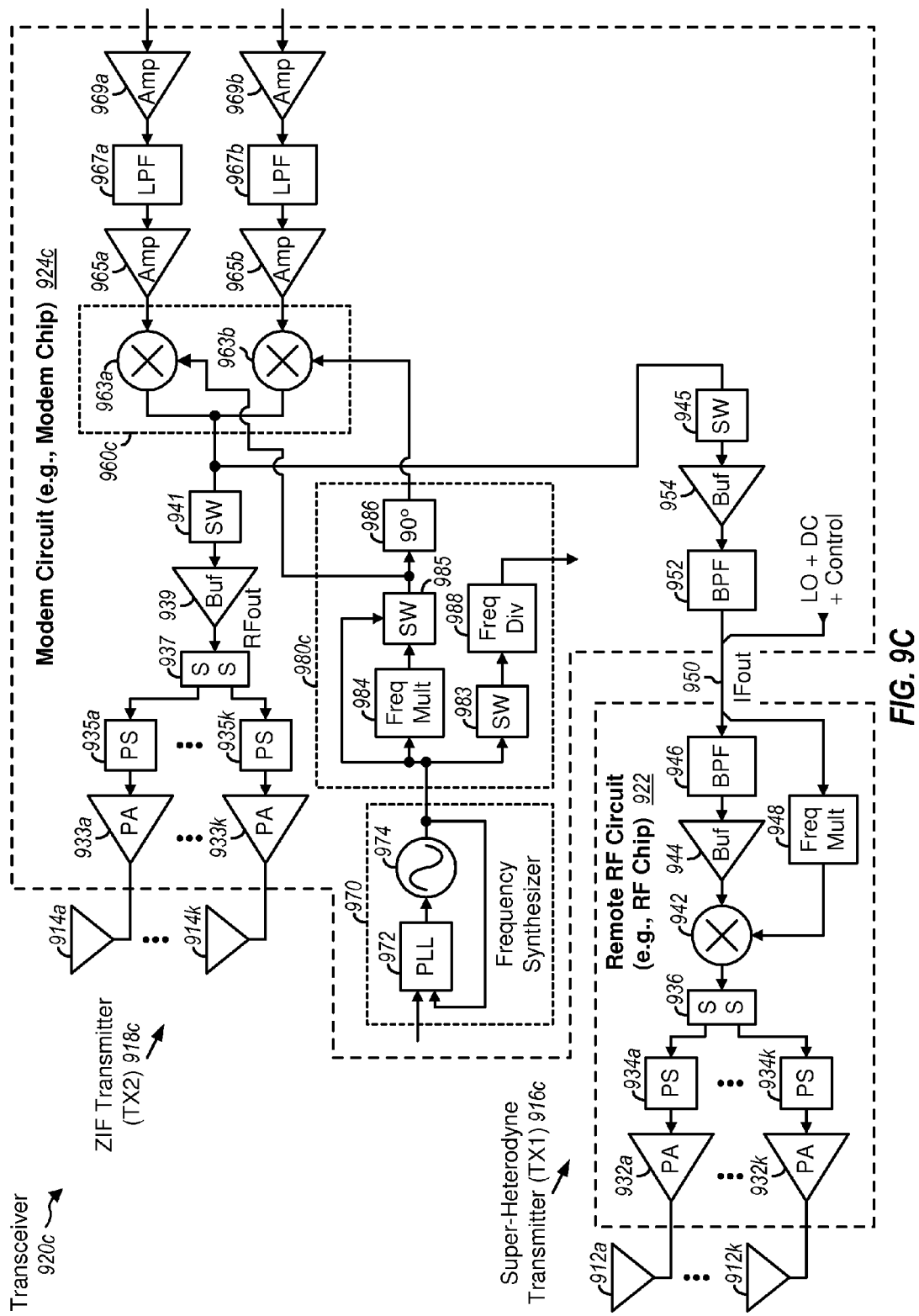

FIG. 9C shows a schematic diagram of an exemplary design of a dual-topology transceiver 920c comprising a super-heterodyne transmitter 916c and a ZIF transmitter 918c with a shared RF/IF and baseband signal path. Transceiver 920c is implemented with remote RF circuit 922 and a modem circuit 924c. Modem circuit 924c is coupled to antennas 914a to 914k and performs (i) baseband-to-RF upconversion for ZIF transmitter 918a and (ii) baseband-to-IF upconversion for super-heterodyne transmitter 916a. RF circuit 922 is coupled to antennas 912a to 912k and performs IF-to-RF upconversion for super-heterodyne transmitter 916a. RF circuit 922 may be implemented on an RFIC chip, and modem circuit 924c may be implemented on another IC chip.

Modem circuit 924c includes all of the circuits in modem circuit 924a in FIG. 9A with the following differences. Modem circuit 924c includes a single RF/IF and baseband signal path comprising amplifiers 969a and 969b, lowpass filters 967a and 967b, amplifiers 965a and 965b, and mixers 963a and 963b. Mixers 963a and 963c are part of a frequency upconversion circuit 960c. The single RF/IF and baseband signal path is used for both super-heterodyne transmitter 916c and ZIF transmitter 918c. Modem circuit 924c does not include amplifiers 968a and 968b, lowpass filters 966a and 966b, amplifiers 964a and 964b, and mixers 962a and 962b in modem circuit 924a in FIG. 9A. Modem circuit 924c further includes (i) a switch 941 coupled between frequency upconversion circuit 960c and buffer 939 and (ii) a switch 945 coupled between frequency upconversion circuit 960c and buffer 954.

Dual-topology transceiver 920c operates as follows. When super-heterodyne transmitter 916c is selected, within modem circuit 924c, I and Q input baseband signals are conditioned by amplifiers 969, filters 967, and amplifiers 965 and then upconverted by frequency upconversion circuit 960c to generate an upconverted IF signal. The upconverted IF signal is routed through switch 945, buffered by buffer 954, and filtered by filter 952 to obtain an output IF signal (IFout). Within RF circuit 922, the output IF signal is conditioned and upconverted from IF to RF to generate output RF signals, which are transmitted via antennas 912. When ZIF transmitter 918c is selected, within modem circuit 924c, I and Q input baseband signals are conditioned by amplifiers 969, filters 967, and amplifiers 965 and then upconverted by frequency upconversion circuit 960c to generate an upconverted RF signal. The upconverted RF signal is routed through switch 941, further conditioned by buffer 939, signal splitter 937, phase shifters 935, and PAs 933, and transmitted via antennas 914. Frequency upconversion circuit 960c thus provides (i) an upconverted IF signal via switch 945 when super-heterodyne transmitter 916c is selected or (ii) an upconverted RF signal via switch 941 when ZIF transmitter 918c is selected.

Modem circuit 924c includes LO generator 980c instead of LO generator 980a in FIG. 9A. LO generator 980c includes switches 983 and 985, frequency multiplier 984, phase shifter 986, and frequency divider 988. Frequency multiplier 984 has its input coupled to the output of frequency synthesizer 970. Switch 985 has its two throws coupled to the outputs of frequency synthesizer 970 and frequency multiplier 984 and its single pole coupled to the input of phase shifter 986. Switch 983 is coupled between the output of frequency synthesizer 970 and the input of frequency divider 988. LO generator 980c may operate in similar manner as LO generator 880c in FIG. 8C.

FIGS. 9A to 9C show some exemplary designs of dual-topology transceivers comprising a super-heterodyne transmitter and a ZIF transmitter. Dual-topology transceivers comprising a combination of super-heterodyne and ZIF transmitters may be implemented in other manners. For example, signal splitter 936 and phase shifters 934 (or signal splitter 937 and phase shifters 935) may be omitted for signal transmission via a single antenna. Filtering, buffering, and amplification may also be performed in other manners. For example, bandpass filters 946 and/or 952 may be omitted. The circuits may also be arranged differently from the arrangements shown in FIGS. 9A to 9C.

FIGS. 7 to 9C show exemplary designs in which an RF circuit can interface with a modem circuit via an RF cable. The RF cable may carry an IF signal, an LO signal, control data, a DC voltage, etc. In general, an RF circuit may interface with a modem circuit via any suitable interface/interconnection, which may comprise one or more coaxial lines, differential lines, transmission lines, and/or signal lines of other types.

Figure 10A:
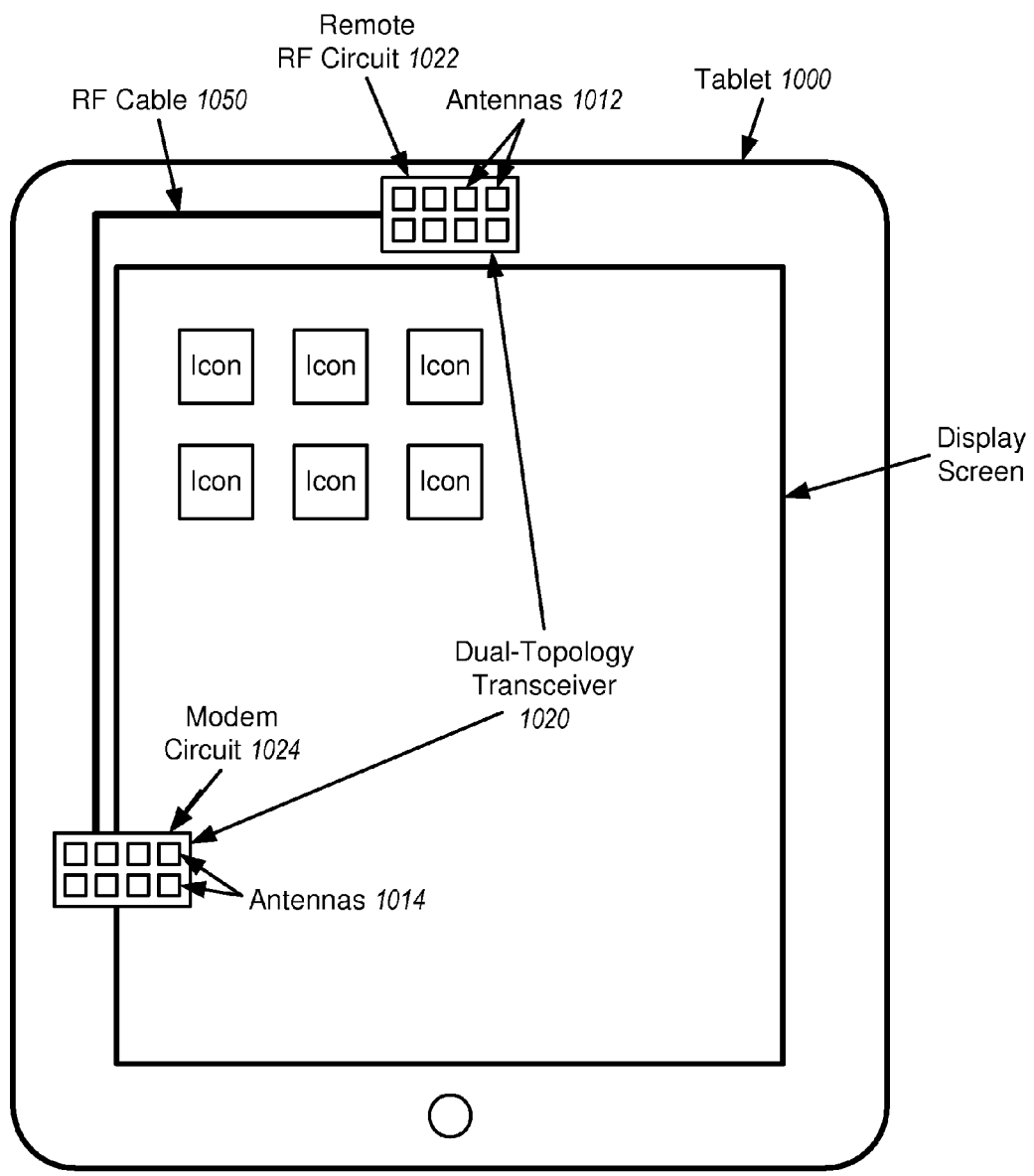
FIGS. 10A, 10B and 10C show exemplary implementations of a dual-topology transceiver in a tablet, a smartphone, and a laptop computer, respectively.

FIG. 10A shows an exemplary implementation of a dual-topology transceiver 1020 in a tablet 1000. Transceiver 1020 may include one or more super-heterodyne receivers and one or more ZIF receivers. Alternatively or additionally, transceiver 1020 may include one or more super-heterodyne transmitters and one or more ZIF transmitters. For example, transceiver 1020 may include receivers 816a and 818a in FIG. 8A, or receivers 816b and 818b in FIG. 8B, or receivers 816c and 818c in FIG. 8C. Alternatively or additionally, transceiver 1020 may include transmitters 916a and 918a in FIG. 9A, or transmitters 916b and 918b in FIG. 9B, or transmitters 916c and 918c in FIG. 9C. Transceiver 1020 is implemented with a remote RF circuit 1022 and a modem circuit 1024. RF circuit 1022 may include the circuits in RF circuit 822 in FIG. 8A, and/or RF circuit 922 in FIG. 9A. Modem circuit 1024 may include the circuits in modem circuit 824a in FIG. 8A, modem circuit 824b in FIG. 8B, modem circuit 824c in FIG. 8C, modem circuit 924a in FIG. 9A, modem circuit 924b in FIG. 9B, and/or modem circuit 924c in FIG. 9C. RF circuit 1022 may be implemented on an RFIC chip, and modem circuit 1024 may be implemented on another IC chip. RF circuit 1022 may be coupled to modem circuit 1024 via an RF cable 1050.

In the exemplary design shown in FIG. 10A, RF circuit 1022 may be located close to antennas 1012 on order to reduce signal transmission loss. Modem circuit 1024 may be located close antennas 1014 in order to reduce signal transmission loss. Antennas 1012 and 1014 may be located sufficiently far apart in order to improve transmit and/or receive diversity. Modem circuit 1024 may also be located close to a designated connector for tablet 1000, which may place some restrictions on the location of antennas 1014. A 2-chip implementation of dual-topology transceiver 1020 for tablet 1000 (e.g., as shown in FIG. 10A) may be desirable when antennas 1012 are not located close to antennas 1014 (e.g., for diversity and/or other reasons) and/or RF circuit 1022 is not located close to modem circuit 1024 (e.g., for layout and/or other considerations).

Figure 10B:
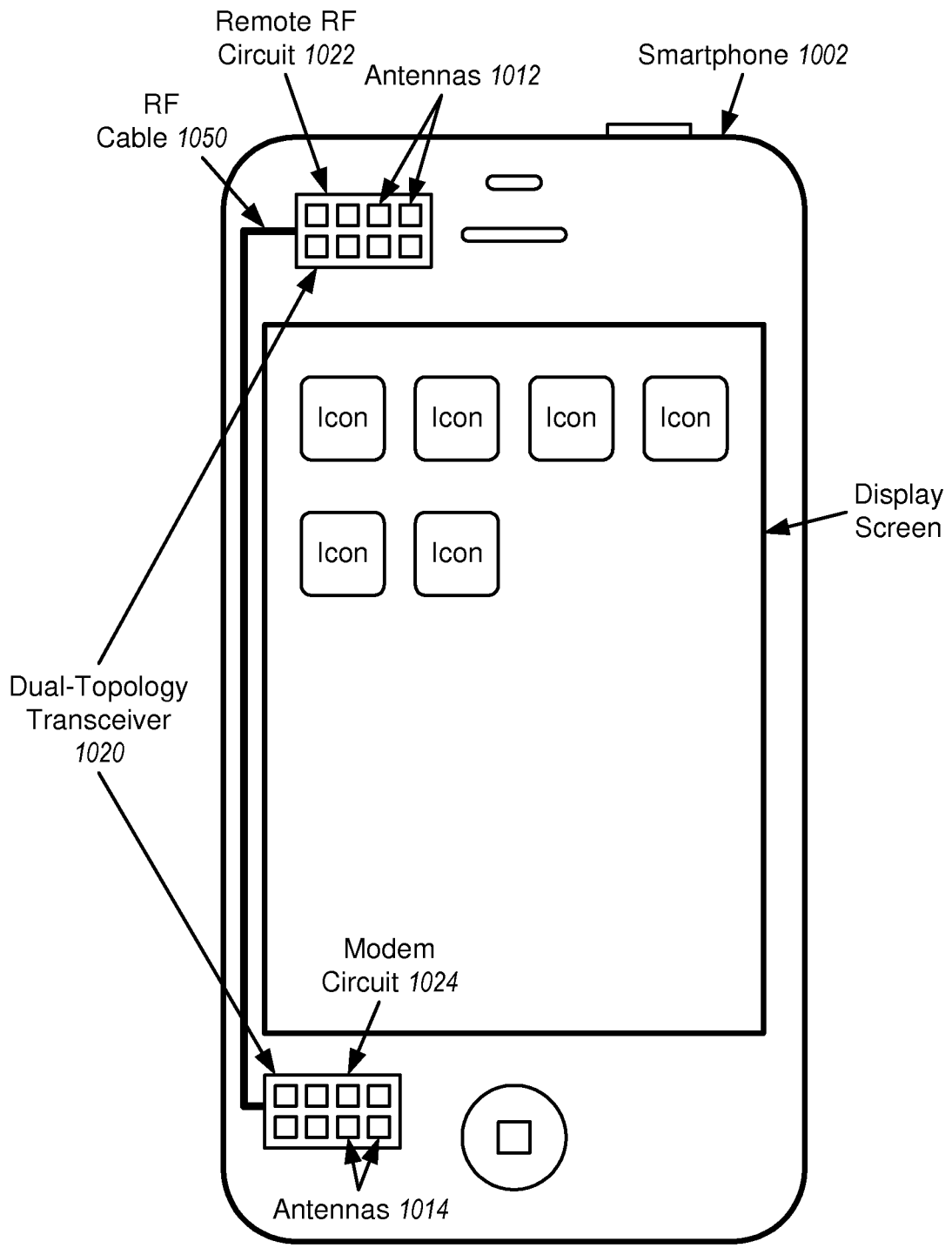

FIG. 10B shows an exemplary implementation of dual-topology transceiver 1020 in a smartphone 1002. Antennas 1012 may be placed at a first location (e.g., near the top) of smartphone 1002, and antennas 1014 may be placed at a second location (e.g., near the bottom) of smartphone 1002. The locations of antennas 1012 and 1014 may be selected to obtain good diversity and/or based on layout and other considerations. RF circuit 1022 may be located close to antennas 1012, and modem circuit 1024 may be located close to antennas 1014 in order to reduce signal transmission loss. A 2-chip implementation of dual-topology transceiver 1020 for smartphone 1002 (e.g., as shown in FIG. 10B) may be desirable when antennas 1012 are not located close to antennas 1014 and/or RF circuit 1022 is not located close to modem circuit 1024.

Figure 10C:
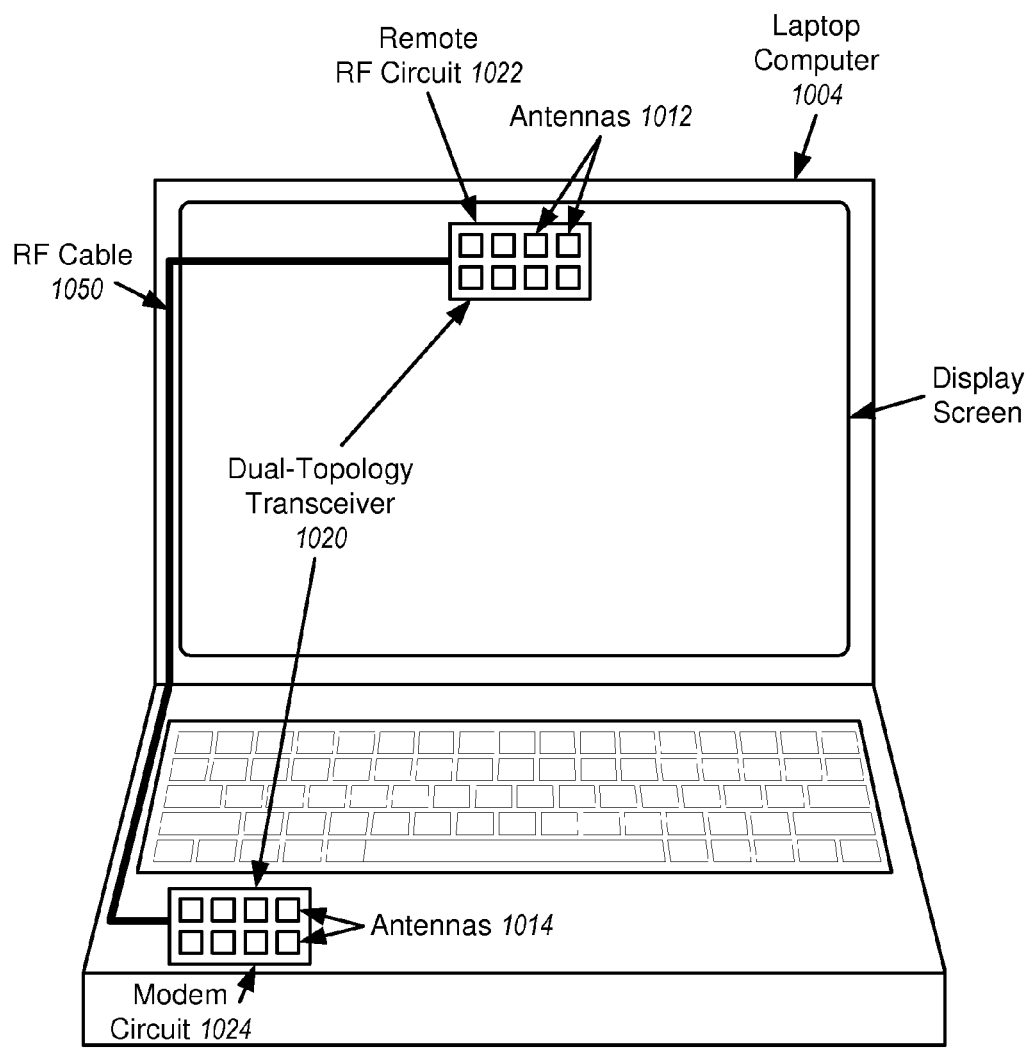

FIG. 10C shows an exemplary implementation of dual-topology transceiver 1020 in a laptop computer 1004. Antennas 1012 may be placed at a first location (e.g., behind a display screen) of laptop computer 1004, and antennas 1014 may be placed at a second location (e.g., underneath a keyboard) of laptop computer 1004. The locations of antennas 1012 and 1014 may be selected to obtain good diversity and/or based on layout and other considerations. RF circuit 1022 may be located close to antennas 1012, and modem circuit 1024 may be located close to antennas 1014 in order to reduce signal transmission loss. A 2-chip implementation of dual-topology transceiver 1020 for laptop computer 1004 (e.g., as shown in FIG. 10C) may be desirable when antennas 1012 are not located close to antennas 1014 and/or RF circuit 1022 is not located close to modem circuit 1024.

FIGS. 10A to 10C show three exemplary implementations of dual-topology transceiver 1020 in a tablet, a smartphone, and a laptop computer. A dual-topology transceiver may also be used for other electronics device supporting wireless communication. For example, a dual-topology transceiver may be used for remote monitoring devices, electronics meters, wearable electronics devices (e.g., watches or glasses), etc.

RF circuit 1022 and modem circuit 1024 may be used in various manners. In a first exemplary design, both RF circuit 1022 and modem circuit 1024 may be used to support signal transmission and/or reception via two antenna arrays, e.g., as shown in FIGS. 10A to 10C. In a second exemplary design, both RF circuit 1022 and modem circuit 1024 may be used to support signal transmission and/or reception via a single antenna array. In this exemplary design, circuits (e.g., mixers 862 in FIG. 8A) for a super-heterodyne receiver and/or circuits (e.g., mixers 962 in FIG. 9A) for a super-heterodyne transmitter in RF circuit 1022 and modem circuit 1024 may be active/enabled. Circuits (e.g., mixers 863 in FIG. 8A) for a ZIF receiver and/or circuits (e.g., mixers 963 in FIG. 9A) for a ZIF transmitter in modem circuit 1024 may be inactive/disabled. In a third exemplary design, only modem circuit 1024 may be used to support signal transmission and/or reception via a single antenna array. In this exemplary design, circuits (e.g., mixers 863 in FIG. 8A) for a ZIF receiver and/or circuits (e.g., mixers 963 in FIG. 9A) for a ZIF transmitter in modem circuit 1024 may be active/enabled. Circuits (e.g., mixers 862 in FIG. 8A) for a super-heterodyne receiver and/or circuits (e.g., mixers 962 in FIG. 9A) for a super-heterodyne transmitter in modem circuit 1024 may be inactive/disabled.

In an exemplary design, an apparatus (e.g., a wireless device, an IC, a circuit module, a circuit board, etc.) may comprise a frequency conversion circuit and an LO generator. The LO generator may generate (i) a first LO signal used for frequency conversion between IF and baseband and (ii) a second LO signal used for frequency conversion between RF and baseband. The frequency conversion circuit may (i) perform frequency conversion between IF and baseband, based on the first LO signal, for an IF signal associated with a first baseband signal and (ii) perform frequency conversion between RF and baseband, based on the second LO signal, for an RF signal associated with a second baseband signal. The first LO signal may comprise I and Q IF LO signals, and the second LO signal may comprise I and Q RF LO signals. The first baseband signal may comprise first I and Q baseband signals, and the second baseband signal may comprise second I and Q baseband signals.

In an exemplary design, the frequency conversion circuit may perform frequency downconversion for a super-heterodyne receiver and a ZIF receiver and may comprise a frequency downconversion circuit, e.g., frequency downconversion circuit 860a in FIG. 8A or frequency downconversion circuit 860c in FIG. 8C. The frequency downconversion circuit may (i) downconvert the IF signal from IF to baseband to generate the first baseband signal and (ii) downconvert the RF signal from RF to baseband to generate the second baseband signal. In an exemplary design, separate RF/IF signal paths may be used for the super-heterodyne receiver and the ZIF receiver, e.g., as shown in FIGS. 8A and 8B. In this exemplary design, the frequency downconversion circuit may include (i) at least one first mixer (e.g., mixers 862a and 862b in FIG. 8A) to downconvert the IF signal with the first LO signal and (ii) at least one second mixer (e.g., mixers 863a and 863b in FIG. 8A) to downconvert the RF signal with the second LO signal. In another exemplary design, a shared RF/IF signal path may be used for the super-heterodyne receiver and the ZIF receiver, e.g., as shown in FIG. 8C. In this exemplary design, the frequency downconversion circuit may include at least one mixer (e.g., mixers 863a and 863b in FIG. 8C), which may (i) downconvert the IF signal with the first LO signal in a first operating mode and (ii) downconvert the RF signal with the second LO signal in a second operating mode. The super-heterodyne receiver may be selected in the first operating mode, and the ZIF receiver may be selected in the second operating mode.

In an exemplary design, separate baseband signal paths may be used for the super-heterodyne receiver and the ZIF receiver, e.g., as shown in FIG. 8A. In this exemplary design, the apparatus may include (i) at least one first filter (e.g., filters 866a and 866b) to filter the first baseband signal from the at least one first mixer (e.g., mixers 862a and 862b) and (ii) at least one second filter (e.g., filters 867a and 867b) to filter the second baseband signal from the at least one second mixer (e.g., mixers 863a and 863b). In another exemplary design, a shared baseband signal path may be used for the super-heterodyne receiver and the ZIF receiver, e.g., as shown in FIG. 8B. In this exemplary design, the apparatus may include at least one filter (e.g., filters 867a and 867b) to (i) filter the first baseband signal from the at least one first mixer in the first operating mode and (ii) filter the second baseband signal from the at least one second mixer in the second operating mode.

In an exemplary design, the frequency conversion circuit may perform frequency upconversion for a super-heterodyne transmitter and a ZIF transmitter and may comprise a frequency upconversion circuit, e.g., frequency upconversion circuit 960a in FIG. 9A or frequency upconversion circuit 960c in FIG. 9C. The frequency upconversion circuit may (i) upconvert the first baseband signal from baseband to IF to generate the IF signal and (ii) upconvert the second baseband signal from baseband to RF to generate the RF signal. In an exemplary design, separate RF/IF signal paths may be used for the super-heterodyne transmitter and the ZIF transmitter, e.g., as shown in FIGS. 9A and 9B. In this exemplary design, the frequency upconversion circuit may include (i) at least one first mixer (e.g., mixers 962a and 962b in FIG. 9A) to upconvert the first baseband signal with the first LO signal to generate the IF signal and (ii) at least one second mixer (e.g., mixers 963a and 963b in FIG. 9A) to upconvert the second baseband signal with the second LO signal to generate the RF signal. In another exemplary design, a shared RF/IF signal path may be used for the super-heterodyne transmitter and the ZIF transmitter, e.g., as shown in FIG. 9C. In this exemplary design, the frequency upconversion circuit may include at least one mixer (e.g., mixers 963a and 963b in FIG. 9C), which may (i) upconvert the first baseband signal with the first LO signal to generate the IF signal in a first operating mode and (ii) upconvert the second baseband signal with the second LO signal to generate the RF signal in a second operating mode. The super-heterodyne transmitter may be selected in the first operating mode, and the ZIF transmitter may be selected in the second operating mode.

In an exemplary design, separate baseband signal paths may be used for the super-heterodyne transmitter and the ZIF transmitter, e.g., as shown in FIG. 9A. In this exemplary design, the apparatus may include (i) at least one first filter (e.g., filters 966a and 966b) to perform filtering for the first baseband signal for the super-heterodyne transmitter and (ii) at least one second filter (e.g., filters 967a and 967b) to perform filtering for the second baseband signal for the ZIF transmitter. In another exemplary design, a shared baseband signal path may be used for the super-heterodyne transmitter and the ZIF transmitter, e.g., as shown in FIG. 9B. In this exemplary design, the apparatus may include at least one filter (e.g., filters 967a and 967b) to (i) perform filtering for the first baseband signal for the super-heterodyne transmitter in the first operating mode and (ii) perform filtering for the second baseband signal for the ZIF transmitter in the second operating mode.

In an exemplary design, the apparatus may include an RF circuit to perform frequency conversion between IF and RF for the IF signal. The RF circuit (e.g., RF circuit 822 in FIG. 8A) may downconvert a second RF signal and provide the IF signal. Alternatively or additionally, the RF circuit (e.g., RF circuit 922 in FIG. 9A) may upconvert the IF signal to generate a second RF signal. In an exemplary design, the RF circuit may be implemented on a first IC chip (e.g., an RFIC chip), and the frequency conversion circuit and the LO generator may be implemented on a second IC chip (e.g., a modem chip). In an exemplary design, the apparatus may further comprise (i) at least one first antenna (e.g., antennas 812 in FIG. 8A or antennas 912 in FIG. 9A) coupled to the first IC chip and (ii) at least one second antenna (e.g., antennas 814 in FIG. 8A or antennas 914 in FIG. 9A) coupled to the second IC chip. The first and second antennas may be used for receive diversity, or transmit diversity, or MIMO transmission, etc.

In an exemplary design, the at least one first antenna may provide at least one first received signal at a first frequency, and the at least one second antenna may provide at least one second received signal at the first frequency. The IF signal at a second frequency may be generated based on the at least one first received signal. The RF signal at the first frequency may be generated based on the at least one second received signal. For IEEE 802.11ad, the first frequency may be 60 GHz, and the second frequency may be 15 GHz. Other first and second frequencies may also be used for IEEE 802.11a and other radio technologies. The at least one first received signal may be downconverted from RF to baseband in a plurality of frequency downconversion stages based on the super-heterodyne topology. The at least one second received signal may be downconverted from RF to baseband in a single frequency downconversion stage based on the ZIF topology.

In an exemplary design, the at least one first antenna may radiate at least one first transmit signal at a first frequency, and the at least one second antenna may radiate at least one second transmit signal at the first frequency. The IF signal at a second frequency may be upconverted to generate the at least one first transmit signal. The RF signal at the first frequency may be conditioned (e.g., filtered and amplified) to generate the at least one second transmit signal. The first baseband signal may be upconverted from baseband to RF in a plurality of frequency upconversion stages to generate the at least one first transmit signal. The second baseband signal may be upconverted from baseband to RF in a single frequency upconversion stage to generate the at least one second transmit signal.

Figure 11:
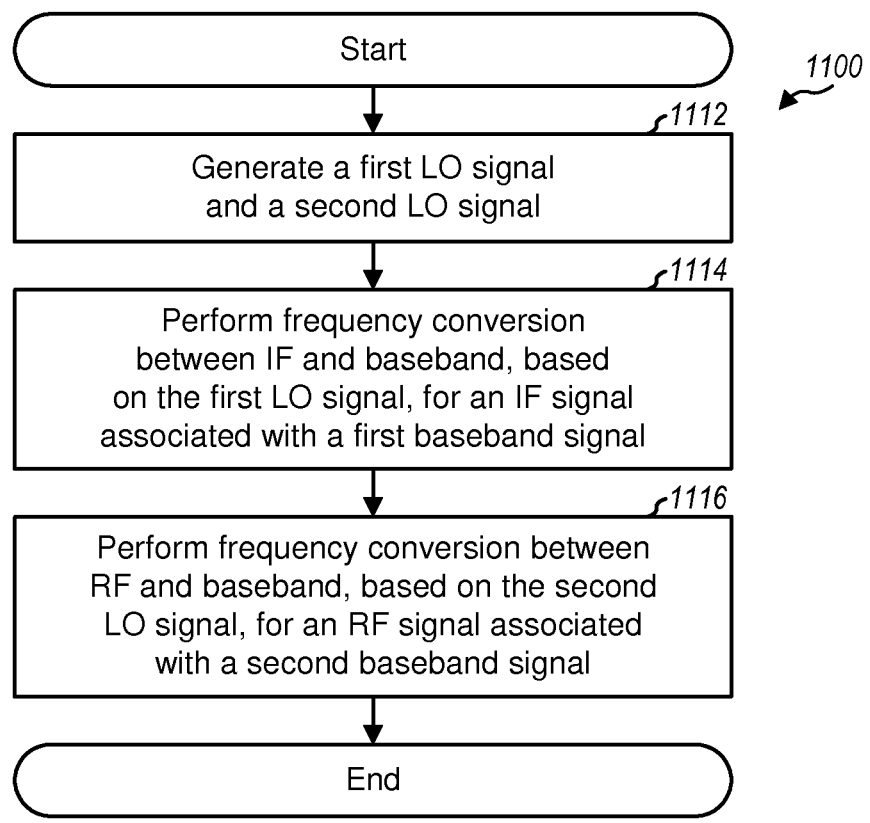
FIG. 11 shows a process for supporting wireless communication.

FIG. 11 shows an exemplary design of a process 1100 for supporting wireless communication. A first LO signal used for frequency conversion between IF and baseband may be generated, e.g., with an LO generator (block 1112). A second LO signal used for frequency conversion between RF and baseband may also be generated, e.g., with the LO generator (also block 1112). Frequency conversion between IF and baseband may be performed based on the first LO signal (e.g., with a frequency conversion circuit) for an IF signal associated with a first baseband signal (block 1114). Frequency conversion between RF and baseband may be performed based on the second LO signal (e.g., with the frequency conversion circuit) for an RF signal associated with a second baseband signal (block 1116).

In an exemplary design, the IF signal may be downconverted from IF to baseband to generate the first baseband signal in block 1112. The RF signal may be downconverted from RF to baseband to generate the second baseband signal in block 1114. In another exemplary design, the first baseband signal may be upconverted from baseband to IF to generate the IF signal in block 1112. The second baseband signal may be upconverted from baseband to RF to generate the RF signal in block 1114.

The circuits (e.g., a frequency conversion circuit, an LO generator, etc.) for a dual-topology transceiver described herein may be implemented on an IC, an analog IC, an RFIC, a mixed-signal IC, an ASIC, a printed circuit board (PCB), an electronic device, etc. The circuits may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuits for a dual-topology transceiver described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
  a local oscillator (LO) generator configured to generate a first LO signal and a second LO signal; and
  a frequency conversion circuit shared between at least two different transceiver topologies, the frequency conversion circuit configured to perform frequency conversion between intermediate frequency (IF) and baseband, based on the first LO signal, for an IF signal associated with a first baseband signal and to perform frequency conversion between radio frequency (RF) and baseband, based on the second LO signal, for an RF signal associated with a second baseband signal, an RF signal associated with the IF signal converted remotely from the frequency conversion circuit.

2. The apparatus of claim 1, the frequency conversion circuit configured to downconvert the IF signal from IF to baseband to generate the first baseband signal and to downconvert the RF signal from RF to baseband to generate the second baseband signal.

3. The apparatus of claim 1, the frequency conversion circuit comprising:
  at least one first mixer configured to downconvert the IF signal with the first LO signal; and
  at least one second mixer configured to downconvert the RF signal with the second LO signal.

4. The apparatus of claim 3, further comprising:
  at least one first filter configured to filter the first baseband signal from the at least one first mixer; and
  at least one second filter configured to filter the second baseband signal from the at least one second mixer.

5. The apparatus of claim 3, further comprising:
  at least one filter configured to filter the first baseband signal from the at least one first mixer in a first operating mode and to filter the second baseband signal from the at least one second mixer in a second operating mode.

6. The apparatus of claim 1, the frequency conversion circuit comprising:
  at least one mixer configured to downconvert the IF signal with the first LO signal in a first operating mode and to downconvert the RF signal with the second LO signal in a second operating mode.

7. The apparatus of claim 1, the frequency conversion circuit configured to upconvert the first baseband signal from baseband to IF to generate the IF signal and to upconvert the second baseband signal from baseband to RF to generate the RF signal.

8. The apparatus of claim 1, the frequency conversion circuit comprising:
  at least one first mixer configured to upconvert the first baseband signal with the first LO signal to generate the IF signal; and
  at least one second mixer configured to upconvert the second baseband signal with the second LO signal to generate the RF signal.

9. The apparatus of claim 1, the frequency conversion circuit comprising:
  at least one mixer configured to upconvert the first baseband signal with the first LO signal to generate the IF signal in a first operating mode and to upconvert the second baseband signal with the second LO signal to generate the RF signal in a second operating mode.

10. The apparatus of claim 1, further comprising:
  an RF circuit configured to perform frequency conversion between IF and RF for the IF signal.

11. The apparatus of claim 10, the RF circuit being implemented on a first integrated circuit (IC) chip, and the frequency conversion circuit and the LO generator being implemented on a second IC chip.

12. The apparatus of claim 11, further comprising:
  at least one first antenna coupled to the first IC chip; and
  at least one second antenna coupled to the second IC chip.

13. The apparatus of claim 1, further comprising:
  at least one first antenna configured to provide at least one first received signal at a first frequency, the IF signal being at a second frequency and generated based on the at least one first received signal; and
  at least one second antenna configured to provide at least one second received signal at the first frequency, the RF signal being at the first frequency and generated based on the at least one second received signal.

14. The apparatus of claim 13, the at least one first received signal being downconverted from RF to baseband in a plurality of frequency downconversion stages, and the at least one second received signal being downconverted from RF to baseband in a single frequency downconversion stage.

15. A method comprising:
  generating a first local oscillator (LO) signal and a second LO signal at an LO generator;
  performing frequency conversion between intermediate frequency (IF) and baseband at a frequency conversion circuit shared between at least two different transceiver topologies, based on the first LO signal, for an IF signal associated with a first baseband signal; and
  performing frequency conversion between radio frequency (RF) and baseband at the frequency conversion circuit, based on the second LO signal, for an RF signal associated with a second baseband signal, an RF signal associated with the IF signal converted remotely from the frequency conversion circuit.

16. The method of claim 15, the performing frequency conversion between IF and baseband comprising downconverting the IF signal from IF to baseband to generate the first baseband signal, and the performing frequency conversion between RF and baseband comprising downconverting the RF signal from RF to baseband to generate the second baseband signal.

17. The method of claim 15, the performing frequency conversion between IF and baseband comprising upconverting the first baseband signal from baseband to IF to generate the IF signal, and the performing frequency conversion between RF and baseband comprising upconverting the second baseband signal from baseband to RF to generate the RF signal.

18. An apparatus comprising:
- means for generating a first local oscillator (LO) signal and a second LO signal;
- means for performing frequency conversion between intermediate frequency (IF) and baseband at a frequency conversion circuit shared between at least two different transceiver topologies, based on the first LO signal, for an IF signal associated with a first baseband signal and; and
- means for performing frequency conversion between radio frequency (RF) and baseband at the frequency conversion circuit, based on the second LO signal, for an RF signal associated with a second baseband signal, an RF signal associated with the IF signal converted remotely from the frequency conversion circuit.

19. The apparatus of claim 18, the means for performing frequency conversion comprising means for downconverting the IF signal from IF to baseband to generate the first baseband signal and for downconverting the RF signal from RF to baseband to generate the second baseband signal.

20. The apparatus of claim 18, the means for performing frequency conversion comprising means for upconverting the first baseband signal from baseband to IF to generate the IF signal and for upconverting the second baseband signal from baseband to RF to generate the RF signal.

* * * * *